(12) United States Patent
Nakamura et al.

(10) Patent No.: US 7,023,940 B2
(45) Date of Patent: Apr. 4, 2006

(54) DEMODULATION AND SYNCHRONIZATION ESTABLISHMENT APPARATUS

(75) Inventors: Manabu Nakamura, Tokyo (JP); Shinichi Miyashita, Fujiyosida (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 800 days.

(21) Appl. No.: 09/955,114

(22) Filed: Sep. 19, 2001

(65) Prior Publication Data
US 2002/0037032 A1    Mar. 28, 2002

(30) Foreign Application Priority Data
Sep. 22, 2000 (JP) .............................. 2000-288829

(51) Int. Cl.
*H04L 7/00* (2006.01)
*H04L 7/06* (2006.01)

(52) U.S. Cl. ....................................... 375/354; 375/364
(58) Field of Classification Search ................ 375/354, 375/359, 360, 364, 365, 367, 368, 222
See application file for complete search history.

(56) References Cited

U.S. PATENT DOCUMENTS

| | | | | |
|---|---|---|---|---|
| 5,668,838 A | * | 9/1997 | Nakamura et al. | 375/340 |
| 5,703,914 A | * | 12/1997 | Nakamura | 375/355 |
| 6,069,883 A | * | 5/2000 | Ejzak et al. | 370/335 |
| 6,650,718 B1 | * | 11/2003 | Fujimura et al. | 375/355 |

* cited by examiner

*Primary Examiner*—Temesghen Ghebretinsae
*Assistant Examiner*—Sam K. Ahn
(74) *Attorney, Agent, or Firm*—Wenderoth, Lind & Ponack, L.L.P.

(57) ABSTRACT

A demodulation method for establishing clock synchronization within a short period of time from a received signal modulated by π/4-shift QPSK modulation that contains a synchronization establishment signal wherein the change in phase periodically alternates between positive and negative, and for demodulating the received signal. The method includes establishing synchronization from the received signal based on the timing of changes in the positive/negative polarity of the change in phase of the synchronization establishment signal contained in the received signal, and demodulating the received signal.

9 Claims, 18 Drawing Sheets

(a)

| Q \ I | 0000 | 0001 | 0010 | ... |
|---|---|---|---|---|
| 0000 | a1 | a2 | a3 | ... |
| 0001 | a4 | a5 | a6 | ... |
| 0010 | a7 | a8 | a9 | ... |
| ⋮ | ⋮ | ⋮ | ⋮ | ⋮ |

(b)

(c)

(a) Case in which preamble is lengthened

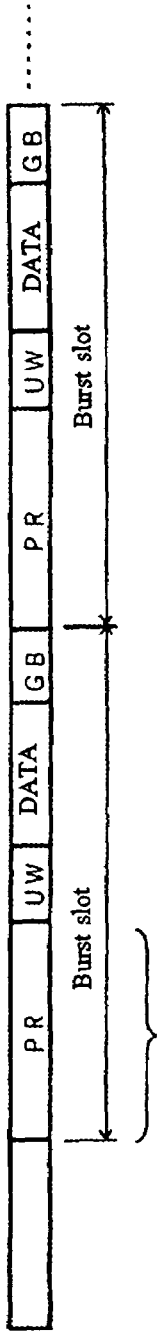

Preamble period is made 100 symbols or longer

In this case, the length of the preamble becomes a large fraction of the entire length, so the data transmission rate drops.

(b) Case in which first burst is discarded

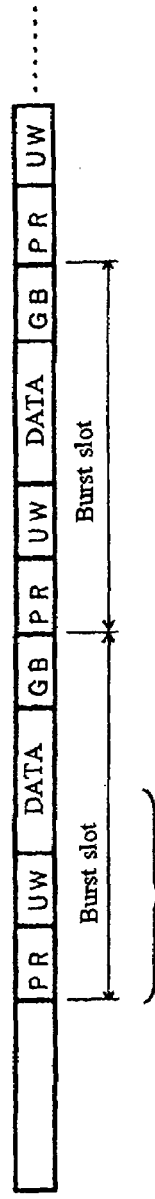

If the preamble is not made long, there is a risk that data cannot be demodulated with only a length of roughly 100 symbols. In the above diagram, there is a risk that the portion up to UW and DATA cannot be received correctly at the time of receipt of the first burst. In addition, it is necessary to hold the timing of synchronization at the time of receipt of the first burst so that it can be used in the second and subsequent bursts.

P R : Preamble pattern
UW : Unique word (identification pattern)
DATA : Body of communications data
G B : Guard bits (buffer timing between slots)

Fig. 18
Prior Art

DEMODULATION AND SYNCHRONIZATION ESTABLISHMENT APPARATUS

BACKGROUND OF THE INVENTION

1. Field of the Invention

The present invention relates to a demodulation method wherein clock synchronization is established from a burst signal which is modulated by means of the $\pi/4$-shift QPSK (Quadrature Phase Shift Keying) modulation scheme, for example, to a synchronization establishment apparatus, modem or base station, and particularly to a technique for establishing synchronization in a short period of time.

2. Description of the Prior Art

In a wireless communications system wherein wireless communication is performed in a burst manner, a wireless transmitter wirelessly transmits a burst signal which is modulated by a modulator, and at the time that a wireless receiver begins the receipt of the burst signal, the establishment of clock synchronization from the burst signal is performed by a demodulator In addition, in such a wireless communications system, various modulation schemes and demodulation schemes are used, for example, $\pi/4$-shift QPSK.

FIG. 16 shows one example of the structure of a burst signal.

As shown in FIG. 16, the various burst slots contained within a burst signal consist of, in order from the beginning, a preamble pattern (PR) which is a pattern for establishing synchronization, a unique word (UW) which is an identification pattern for determining the base position of the burst, DATA which is the body of communications data, and guard bits (GB) which prevent the overlapping of bursts by providing buffer timing between slots.

When communication is performed in bursts, the receiver refers to the preamble pattern at the start of receiving the respective bursts, and establishes the synchronization of its own clock. When a burst signal having a frame format as shown in FIG. 16 above is used, it is preferable to establish synchronization prior to the unique word, for example.

In addition, FIG. 17 shows one example of a demodulation circuit which is implemented in a wireless receiver that establishes clock synchronization as described above. In this demodulation circuit, clock synchronization is established by means of feedback control as a typical method. In addition, the example shown in FIG. 17 illustrates the case in which demodulation is performed by the delay detection system wherein $\pi/4$-shift QPSK is used as the modulation scheme.

Specifically, in the demodulation circuit illustrated in FIG. 17, a ($\pi/4$-shift QPSK) burst signal received by a wireless receiver is converted from an analog signal to a digital signal by means of an A/D converter 81, demodulated into an I component (in-phase component) and a Q component (quadrature component) by a demodulator 82, and then the I component and the Q component are filtered by filter 83 and filter 84, respectively.

The I component and the Q component which are output from the two filters 83 and 84 are input to a (delayed) detector 85 and are also input to a clock phase detection circuit 86. Moreover, in the detector 85, the input I component and the Q component are demodulated by delayed detection so as to generate demodulated data. In addition, a parallel/serial converter 88 converts the demodulated data of the I component and the Q component output from the detector 85 from parallel data to serial data. Further, the clock phase detection circuit 86 detects the phase of the clock from the inputted I component and Q component, and a clock regeneration circuit 87 generates a synchronization clock based on the results of this detection, whereby feedback control of the aforementioned A/D converter 81, filters 83 and 84, and detector 85 is performed.

As an example of the prior art of $\pi/4$-shift QPSK synchronization detection circuits, we shall describe the "Digital Demodulation Circuit, Maximum Value Detection Circuit and Receiver" recited in the publication of unexamined Japanese patent application JP-A-9-266499.

This example of prior art relates to a Personal Handy phone System (PHS) or other mobile communications system, with an object of providing a digital demodulator having a synchronization detection circuit that enables a high-speed operation and that can be implemented in a more compact manner or in ICs, and relates to technology for eliminating frequency errors and phase errors between the transmitter and receiver.

Specifically, in this prior-art example, a preamble pattern consisting of a repeated pattern of "1001" is used, and by detecting the frequency difference during the period of this preamble pattern and by forming a frequency difference compensation signal based on a phase change pattern of instantaneous phase signals during this preamble pattern, it is intended to enlarge the permissible range of phase noise over which the phase difference between the carrier signals can be correctly detected In addition, in this prior-art example, a carrier generator compares the phase of the carrier signal it generates itself against the phase of the carrier signal of the received signal so as to detect the phase error, and thus the establishment of synchronization is performed by correcting this phase error. In addition, in this prior-art example, the phase of the $\pi/4$-shift QPSK received signal is shifted backwards by $\pi/4$ and processing is performed in a manner corresponding to QPSK. In this case, the preamble pattern becomes a waveform wherein a phase change of $\pi$ is repeated every symbol, so it can be treated as a Binary Phase Shift Keying (BPSK) signal, and thus it is resistant to erroneous detection due to phase noise and high-precision phase detection is possible.

However, in the prior-art demodulation circuit shown in FIG. 17, in order to establish clock synchronization based on the preamble pattern, with the performance of a typical receiver, there is a difficulty in that a reception period is required that is as long as approximately 100 symbols from the start of reception of the burst signal.

Here, with reference to FIG. 18, we shall describe in detail the problems that occur due to the aforementioned difficulty.

FIG. 18(*a*) shows an example of the structure of a burst signal in the case wherein, in order to handle the long period until the establishment of the clock of approximately 100 symbols, a preamble pattern having a length (period) which is equivalent to 100 symbols or longer is provided. However, in this case, since the length (period) of the preamble pattern becomes a large fraction of the length (period) of the entire burst slot, there is a problem in that this preamble pattern period becomes wasted time in data communications, thus decreasing the data communications (transmission) rate.

In addition, FIG. 18(*b*) shows an example of the structure of a burst signal in the case wherein the length (period) of the preamble pattern is not as long as that shown in FIG. 18(*a*). In this case, there is a possibility that the received signal cannot be demodulated correctly during the period of roughly 100 symbols from the start of reception, so there is a possibility that at the time of reception of the first burst, the unique word and data periods also cannot be demodulated normally. For this reason, there is the problem in that it will be assumed that the data received during the receipt of the first burst cannot be received normally and thus this data received in the first burst will be discarded. In addition, there is also a problem in that the timing of synchronization which is established at the time of receipt of the first burst must be stored for use at the time of receipt of the second and subsequent bursts.

The present invention was accomplished in order to solve the aforementioned problems with the prior art. Accordingly, an object of the present invention is to provide a demodulation method wherein, at the time of the establishment of clock synchronization based on a burst pattern contained at the front of a ($\pi$/4-shift QPSK) burst signal, synchronization can be established in a short period of time, and also to provide a synchronization establishment apparatus, modem and base station.

SUMMARY OF THE INVENTION

To attain the above-described object, the demodulation method according to the present invention comprises establishing synchronization from a received signal that contains a synchronization establishment signal wherein the change in phase (of the synchronization establishment signal) periodically alternates between positive and negative, and demodulating said received signal. More specifically, the demodulation method comprises establishing synchronization from the received signal based on the timing of changes in the positive/negative polarity of the change in phase of the synchronization establishment signal that is contained in the received signal, and demodulating said received signal.

Accordingly, by establishing the synchronization (e.g., clock synchronization) based on the timing at which the phase difference of the synchronization establishment signal (e.g., a preamble pattern) periodically alternates between positive and negative, it is possible to establish synchronization in a short period of time. Thereby, it is possible to make the length (period) of the preamble pattern relatively short and increase the data transmission rate. In addition, even when a preamble pattern of a short length (period) is used, synchronization is established within the period of the preamble pattern, so it is possible for the received data in the first burst reception to be received correctly and reliably.

In addition, in the demodulation method according to the present invention, at the time of performing demodulation as described above, synchronization is established for each received signal from a plurality of received signals, and each of the received signals is demodulated.

As described above, in accordance with the present invention, synchronization can be established in a short period of time, so even in the above case in which a plurality of received signals containing synchronization establishment signals are received at nearly the same timing, it is possible to establish synchronization with each of the plurality of received signals in a short period of time, and as a result, it is possible to establish synchronization in a short period of time with the entire plurality of received signals.

In addition, in accordance with the present invention, when the same technical idea as that of the aforementioned demodulation method according to the present invention is applied to a synchronization establishment apparatus, modem and base station, the establishment of synchronization from received signals can be achieved in a short period of time in the same manner as above.

Specifically, in a synchronization establishment apparatus according to the present invention, at the time of establishing synchronization from a received signal containing a synchronization establishment signal wherein the change in phase (of the synchronization establishment signal) periodically alternates between positive and negative, the positive/negative change timing detection means detects the timing of changes in the positive/negative polarity of the change in phase of the synchronization establishment signal that is contained in the received signal, and synchronization is established from the received signal based on the timing which is detected by the synchronization establishment means.

In addition, the modem according to the present invention, in the following manner, modulates transmitted signals, establishes synchronization from a received signal that contains a synchronization establishment signal wherein the change in phase (of the synchronization establishment signal) periodically alternates between positive and negative, and demodulates the received signal. To wit, the modulating means modulates transmitted signals, the positive/negative change timing detection means detects the timing of changes in the positive/negative polarity of the change in phase of the synchronization establishment signal that is contained in the received signal, the synchronization establishment means establishes synchronization from the received signal based on the timing which is detected by the synchronization establishment means, and the demodulation means demodulates the received signal according to the synchronization timing which is established by the demodulation means.

In addition, the base station according to the present invention is implemented in a traffic information system wherein base stations and mobile stations communicate wirelessly. Moreover, the base station according to the present invention, in the following manner, modulates signals and wirelessly transmits the same to the mobile stations, wirelessly receives from the mobile stations a signal that contains a synchronization establishment signal wherein the change in phase (of the synchronization establishment signal) periodically alternates between positive and negative, establishes synchronization from the received signal and demodulates the received signal. To wit, in the base station, an antenna transmits and receives wireless signals, a modulating means modulates signals, a transmission means wirelessly transmits modulated signals to the mobile stations via the antenna, while a receiving means receives, via the antenna, signals that are transmitted wirelessly from the mobile stations, a positive/negative change timing detection means detects the timing of changes in the positive/negative polarity of the change in phase of the synchronization establishment signal that is contained in the received signal, a synchronization establishment means establishes synchronization from the received signal based on the detected timing, and a demodulation means demodulates the received signal according to the established synchronization timing. In addition, a control means communicates the signals which are exchanged with the mobile station to an external apparatus (e.g., other base stations or a main control facility).

The above and other objects, features and advantages of the present invention will become more apparent from the description given hereinbelow with reference to the accompanying drawings.

BRIEF EXPLANATION OF THE DRAWINGS

FIG. 18 is a diagram used to explain the problem in the prior art.

DETAILED DESCRIPTION OF THE PREFERRED EMBODIMENTS

We shall now describe the synchronization establishment circuit (synchronization establishment apparatus) according to Example 1 of the present invention with reference to the drawings. Note that in this Example, we shall also describe the demodulation method according to the present invention.

Figure 1:
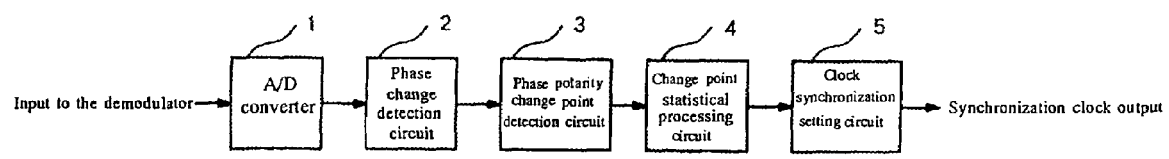
FIG. 1 is a schematic diagram of an example of the constitution of a synchronization establishment circuit according to Example 1 of the present invention.
Figure 16:
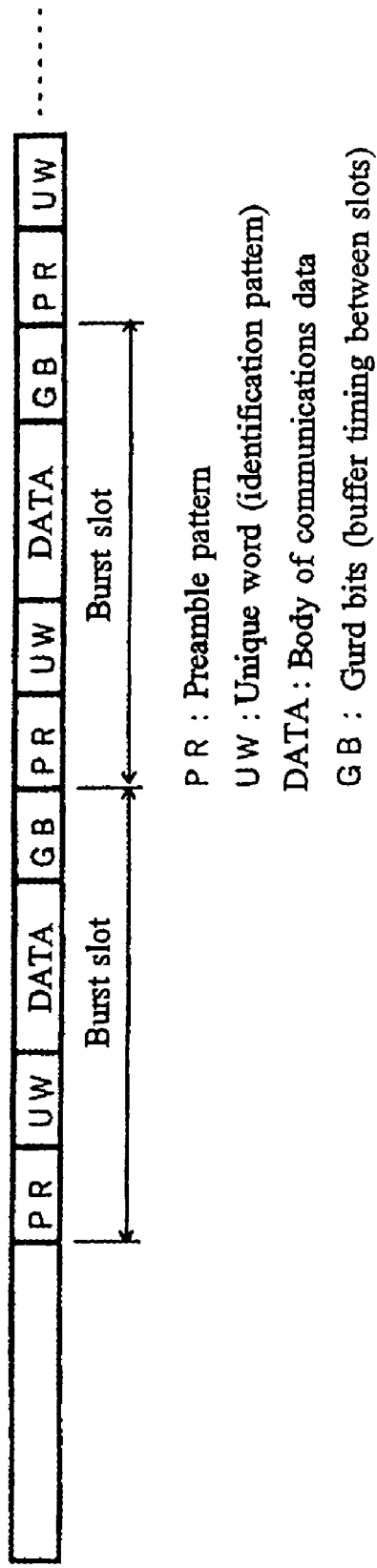
FIG. 16 is a diagram showing an example of the constitution of a burst signal.
Figure 17:
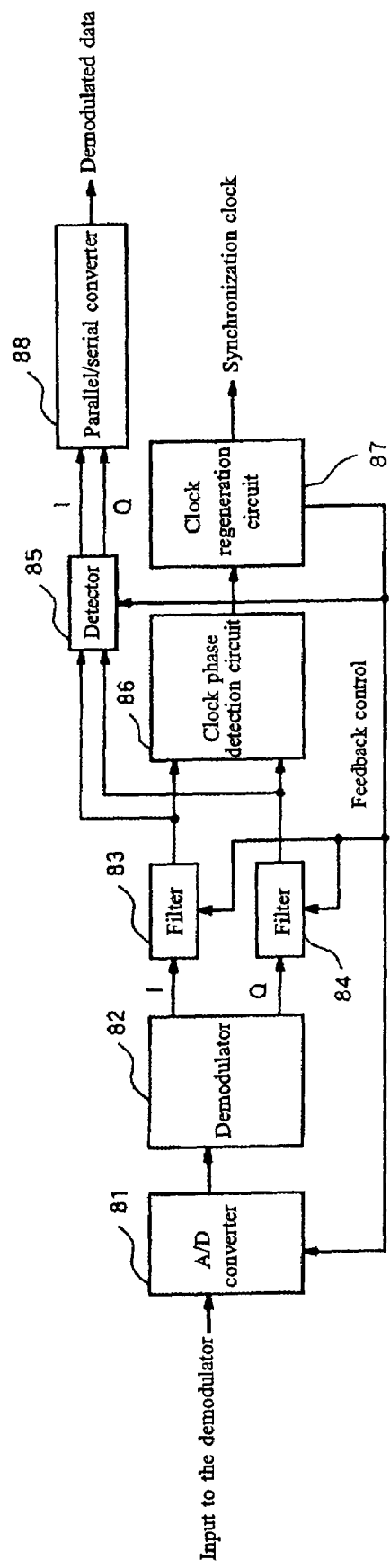
FIG. 17 is a diagram showing an example of the constitution of a demodulation circuit according to a prior-art example.

FIG. 1 is a schematic diagram of an example of the constitution of a synchronization establishment circuit according to this Example. This synchronization establishment circuit is equipped with a wireless receiver that receives burst signals having the same structure as that shown in FIG. 16, and establishes the clock synchronization based on the preamble pattern that is contained in the burst signals.

In addition, this Example illustrates the case wherein the wireless transmitter and the wireless receiver perform the wireless communication of signals by using the π/4-shift QPSK modulation scheme. In addition, this Example illustrates the case in which the preamble pattern that is contained at the start of the burst signal which is wirelessly transmitted from the wireless transmitter is a pattern wherein "1001" is repeatedly generated to form the pattern "100110011001 . . . "

Here, the pattern with "1001" repeated in π/4-shift QPSK becomes a pattern wherein the change in phase periodically alternates between positive and negative, and we shall now describe this in detail.

Figure 2:
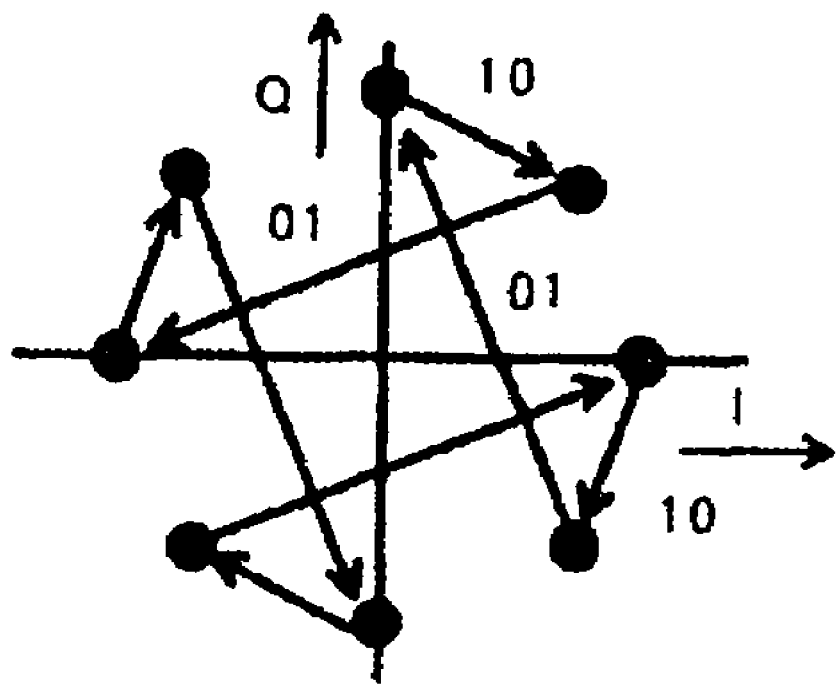
FIG. 2 is a diagram of one example of a phase change in the preamble pattern.

FIG. 2 shows an example of the transition in the phase of the modulated wave in a modulated wave which is generated by modulating the aforementioned preamble pattern by means of the π/4-shift QPSK modulation scheme. In FIG. 2, the I component is shown on the horizontal axis while the Q component is shown on the vertical axis. Note that this modulated wave is obtained by subjecting the aforementioned preamble pattern to Gray encoding, summation logic-value conversion, and π/4-shift QPSK modulation.

As shown in FIG. 2, in π/4-shift QPSK, the bit pattern (symbol) "10" may correspond to a phase change of $-(\pi/4)$ (a phase change in which the change in phase is negative), for example, and the bit pattern (symbol) "01" may correspond to a phase change of $+(3\pi/4)$ (a phase change in which the change in phase is positive), for example. To wit, in a pattern wherein "10" and "01" are repeated (a pattern wherein "1001" is repeated), the change in phase periodically alternates between positive and negative. In addition, with this pattern, when eight transitions in the phase of the modulated wave occur, the phase in question has undergone a transition of one complete revolution ($2\pi$), and has returned to the original phase position.

Note that in this Example, the preamble pattern consists of a 1-byte ramp (R) and a 4-byte preamble, giving a total of 5 bytes of data (20 symbols worth of data), so "1001" is repeated 10 times.

In addition, while the Examples in this Specification illustrate cases wherein a pattern in which "1001" is repeated is used as the preamble pattern, it is also possible, according to the present invention, to use any other pattern as the preamble pattern so as long as the change in phase periodically alternates between positive and negative.

Figure 3:
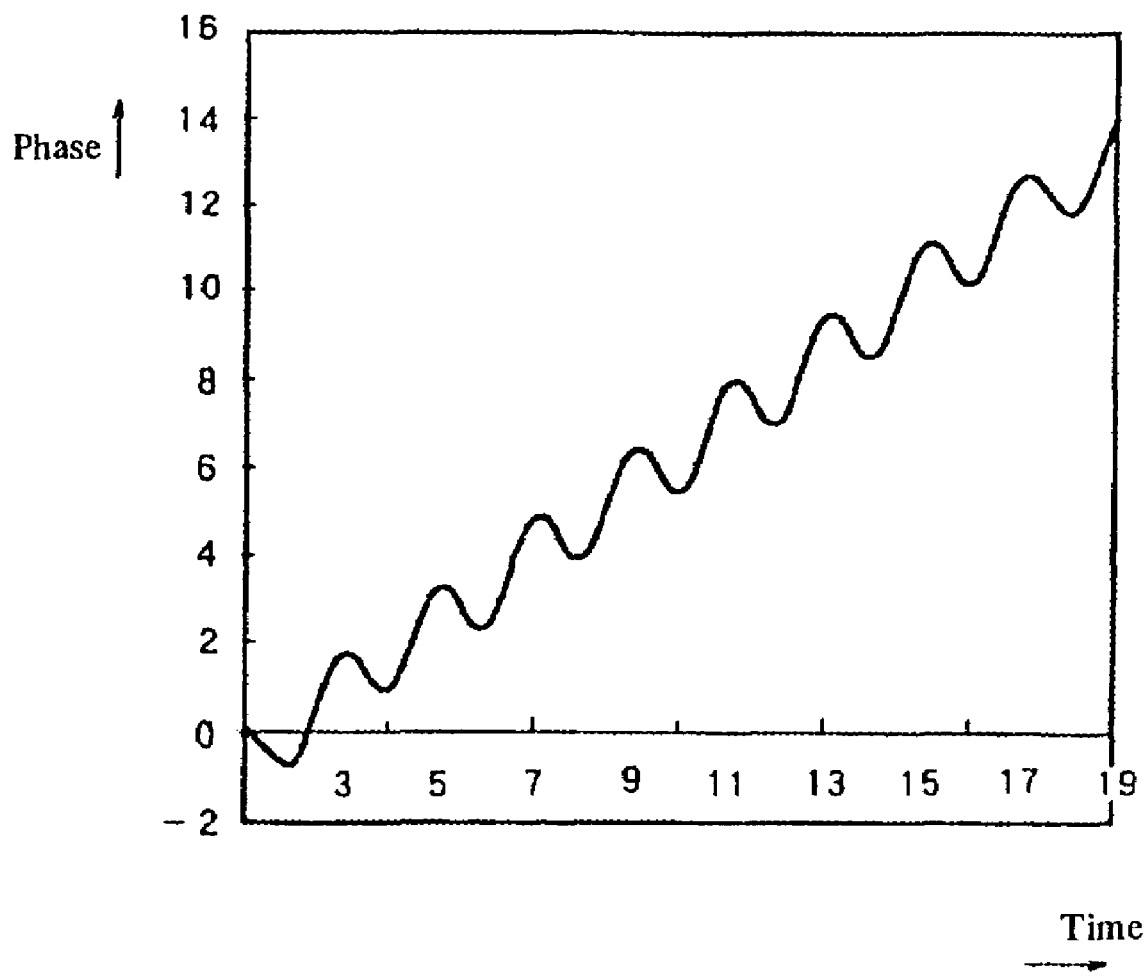
FIG. 3 is a diagram of one example of a phase change waveform in the preamble pattern.

In addition, FIG. 3 illustrates the transition in the phase of the preamble pattern shown in FIG. 2 above as a waveform of the phase change over elapsed time. In FIG. 3, time is shown on the horizontal axis while the phase is shown on the vertical axis.

As shown in FIG. 3 above, in π/4-shift QPSK, the "100110011001 . . . " preamble pattern gives rise to a periodic change in phase, and the change in phase also periodically alternates between positive and negative. In this Example, as will be described later, the detection of such a change in phase (direction) is used to detect the precise point of change between symbols (here, the symbol "10" and the symbol "01") and therefore establish clock synchronization.

In reference to FIG. 1 above, we shall present a schematic example of the operation of the synchronization establishment circuit of this Example.

As shown in FIG. 1, the synchronization establishment circuit of this Example consists of an A/D converter 1, a phase change detection circuit 2, a phase polarity change point detection circuit 3, a change point statistical processing circuit 4 and a clock synchronization setting circuit 5.

The A/D converter 1 has the functions of accepting the input of a burst signal (here, the preamble pattern signal that is contained in the burst signal) which is received as an input to the demodulator, converting this signal from an analog signal to a digital signal, and providing the output of the converted digital signal (digital value) to the phase change detection circuit 2

The phase change detection circuit 2 has the functions of detecting the change in phase of the digital signal based on the value of the digital signal that is input from the A/D converter 1, and providing the results of this detection as output to the phase polarity change point detection circuit 3.

The phase polarity change point detection circuit 3 has the functions of determining the polarity of the change in phase (whether this change is positive or negative) which is detected by the phase change detection circuit 2, detecting the point in time (timing) when this polarity changes, and providing the results of this detection as output to the change point statistical processing circuit 4. Note that such a polarity change point may be acquired by detecting the timing at which the polarity of the phase change which is detected by the phase change detection circuit 2 inverts (changes from positive to negative, or changes from negative to positive), and namely, this timing can be used as the polarity change point.

The change point statistical processing circuit 4 has the functions of counting the number of polarity change points which are detected by the phase polarity change point detection circuit 3 within the measurable range of the preamble pattern, for example, determining the timing period (time interval between adjacent polarity change points) that most closely fits the detected plurality of polarity chance points, and providing the output of the results of this determination to the clock synchronization setting circuit 5.

Note that by assuming no errors in wireless communications, it would be possible to detect one timing period for every symbol, but considering the errors in actual wireless communications, it is preferable to sample a large number of timing periods (preferably as many as possible) In addition, the number of samplings of the timing period may be determined based on the length (period) of the preamble pattern, for example. The aforementioned change point statistical processing circuit 4 tabulates the sampled timing periods, and, for example, may take an average of a plurality of detected results and report the resulting timing period to the clock synchronization setting circuit 5, or, may determine the most frequently detected timing period based on a distribution of the tabulated results and report this to the clock synchronization setting circuit 5.

The clock synchronization setting circuit 5 has the functions of using the timing period which is reported from the change point statistical processing circuit 4 to establish the clock synchronization (bit synchronization), and providing the output of a synchronization clock generated based thereupon to the various processors (that operate on this synchronization clock). Note that the establishment of clock synchronization is achieved by matching the period of the pulse signals that constitute this clock to the aforementioned timing period.

Next, we shall present an example of a more specific constitution of the synchronization establishment circuit of this Example, and an example of its operation.

Figure 4:
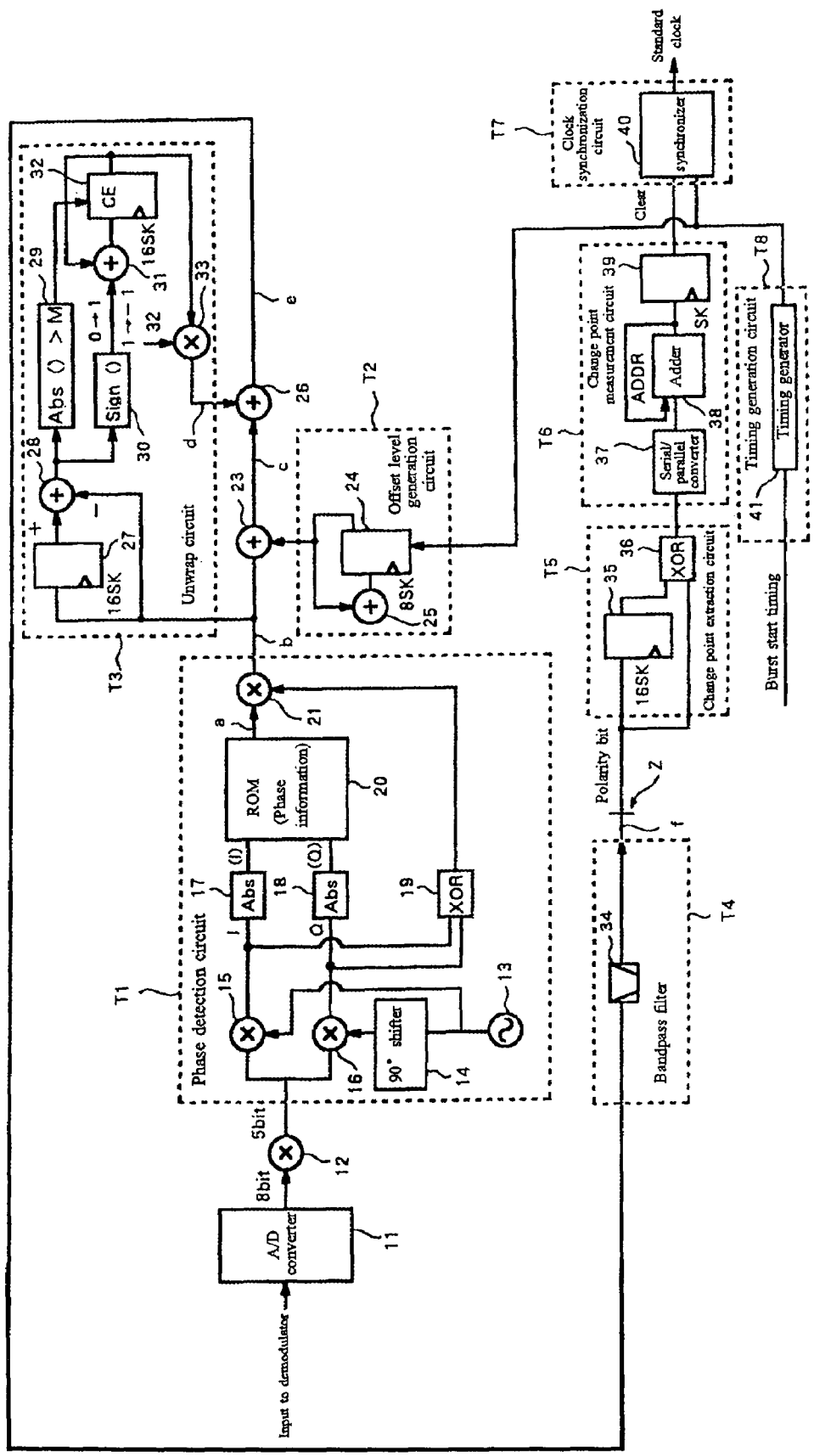
FIG. 4 is a diagram of the specific constitution of the synchronization establishment circuit according to Example 1 of the present invention.

FIG. 4 shows a more specific constitution of the synchronization establishment circuit of this Example.

The synchronization establishment circuit shown in FIG. 4 consists of an A/D converter 11, a multiplier 12, a phase detection circuit T1, an offset level generation circuit T2, an unwrap circuit (a circuit that corrects discontinuity data when the phase has rotated by 1 revolution (or by π in this Example)) T3, a filter circuit T4, a polarity bit converter Z, a change point extraction circuit T5, a change point measurement circuit T6, a clock synchronization circuit T7 and a timing generation circuit T8.

Note that in the circuit of this Example, analog data is sampled at a clock running at 16 times the baud rate.

Based on a timing signal that is output from a timing generator 41 which is to be described later, for example, the A/D converter 11 accepts an input of a burst signal (here, the preamble pattern signal that is contained in the burst signal) which is received as the input to the demodulator, converts this signal from an analog signal to a digital signal (8-bit in this Example), and provides the output of the converted digital signal (digital value) to the phase change detection circuit 2.

The multiplier 12 takes the 8-bit digital signal that is input from the A/D converter 11, converts this signal to a 5-bit digital signal (performing rounding of the number of bits) which is output to a multiplier 15 and multiplier 16 which are provided in the phase detection circuit T1.

The phase detection circuit T1 consists of an oscillator 13, a 90° shifter 14, two multipliers 15 and 16, two absolute value calculators 17 and 18, an XOR 19, a ROM 20 and a multiplier 21.

The oscillator 13 generates a carrier-wave signal for demodulating the I component and provides output of this carrier-wave signal to the 90° shifter 14 and the multiplier 15.

The 90° shifter 14 shifts the phase of the input carrier-wave signal that is input from the oscillator 13 by 90° so as to generate a carrier-wave signal for the Q component, and this carrier-wave signal is output to the multiplier 16.

The multiplier 15 multiplies the signal that is input from the multiplier 12 by the signal that is input from the oscillator 13 so as to demodulate the data of the I component, and provides the data of this I component as output to the absolute value calculator 17.

Similarly, the multiplier 16 multiplies the signal that is input from the multiplier 12 by the signal that is input from the 90° shifter 14 so as to demodulate the data of the Q component, and provides the data of this Q component as output to the absolute value calculator 18.

The absolute value calculator 17 has the function of obtaining the absolute value of the data of the I component which is input from multiplier 15, and thus provides an output of the absolute value of the data of this I component to the ROM 20.

Similarly, the absolute value calculator 18 has the function of obtaining the absolute value of the data of the 1 component which is input from the multiplier 16, and thus provides an output of the absolute value of the data of this Q component to the ROM 20

The XOR 19 accepts an input of one bit of data that indicates the polarity (positive/negative) of the data of the I component which is output from multiplier 15, along with an input of one bit of data that indicates the polarity (positive/negative) of the data of the Q component which is output from multiplier 15. Moreover, based on the two bits of data (indicating polarity) thus input, the XOR 19 provides an output to the multiplier 21 of data of the value "1" in the case where the values (e.g., the value "1" or the value "0") of these two bits of data are different, or provides an output to the multiplier 21 of data of the value "0" in the case where the values of these two bits of data are the same.

The ROM 20 accepts an input of the absolute value of the data of the I component which is input from the absolute value calculator 17 and the absolute value of the data of the Q component which is input from the absolute value calculator 18, and provides an output to the multiplier 21 of the phase corresponding to these two absolute values.

Here, the ROM 20 in this Example may contain a previously prepared table, for example, and thus may determine the phase to be output as above based on this table.

Figure 5:
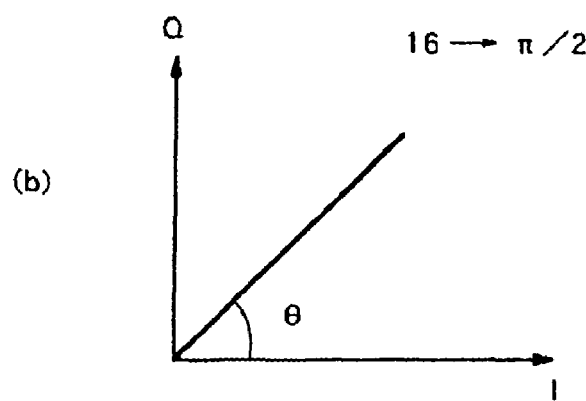
FIG. 5 is a diagram for explaining one example of a table that is stored in ROM.
Figure 5:
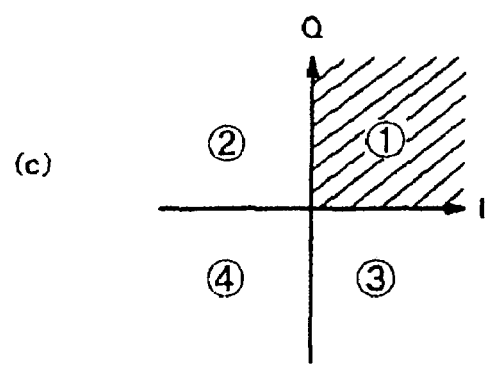

FIG. 5(*a*) illustrates one example of such a table, where the positions of the I phase and Q phase are plotted in a matrix. Specifically, the values of the phases (e.g., "a1" through "a9") are stored for each pair of the absolute value of the data of the I component (e.g., "0001") and the absolute value of the data of the Q component (e.g., "0001"), whereby the aforementioned phases are determined thereupon.

Note that in this Example, as shown in FIG. 5(*b*), for only the portion which is equivalent to ¼ of the phase waveform (the portion consisting of the first quadrant wherein the phase θ is from 0 to π/2), the aforementioned plot matrix (where 0 to π/2 is divided into 15 parts in this Example) is kept in a table. The reason for this is that when the plot position lies in another portion (the second quadrant, third quadrant or fourth quadrant), it is possible to determine the position by shifting the position to a corresponding position in the table (the equivalent position in the first quadrant).

In addition, when considering a wireless communications system, while the timing at which a mobile station enters the region in which communication is possible (called the "cell") of a base station is unknown (arbitrary), regardless of the timing of entry, if the base station consults the equivalent position in the aforementioned table at the time that a mobile station enters the cell, there is no problem with establishing synchronization.

We shall now describe the above in detail with reference to FIG. 5(*c*).

To wit, the ROM 20 of this Example contains only information for the 0°–90° portion (the portion which is indicated by ① in FIG. 5(*c*)). Here, the output value of the XOR 19 becomes "1" in the portions which are indicated by ② and ③ in FIG. 5(*c*), and in this case, the multiplier 21 to be described later inverts the polarity of the output value from the ROM 20. In addition, the output value of XOR 19 becomes "0" in the portion which is indicated by ④ in FIG. 5(*c*), and in this case, the multiplier 21 to be described later does not invert the polarity of the output value from the ROM 20 (but rather outputs the same value as the output value). For this reason, in this Example, while the information from −180° to +180° in the output from the multiplier 21 to be described later is represented only with values from −90° to +90°, the unwrap circuit T3 to be described later stitches together the phase information so that it is possible to represent all phase information (from −180° to +180°).

Note that it is also possible to store the aforementioned plot matrix in a table for the entire portion of all four fourths of the phase waveform including the aforementioned other portions (the portion consisting of the first through fourth quadrants), and thus determine the phase, but by adopting the aforementioned preferred embodiment in this Example, the storage capacity required of the ROM 20 is reduced.

Figure 6:
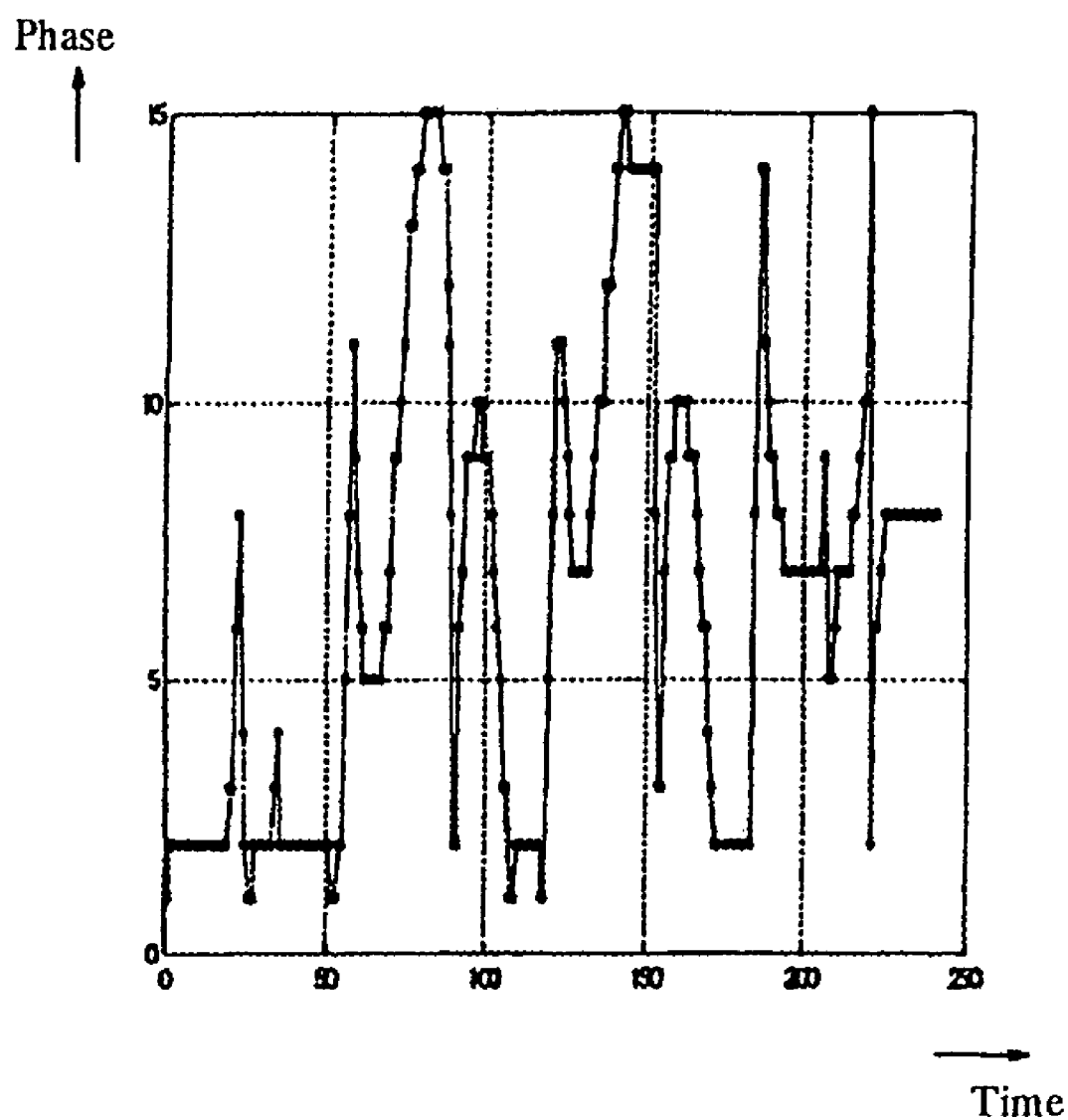
FIG. 6 is a diagram showing one example of the phase outputted from ROM.

In addition, FIG. 6 illustrates one example of the phase that is output from the ROM 20 (the value at the point "a" illustrated in FIG. 4), where the time (e.g., the value in the case that the number of samplings is used as a unit) is shown on the horizontal axis while the phase (e.g., the value when the phase π is set to 32) is shown on the vertical axis.

Based on the value of data that is input from the XOR 19, the multiplier 21 applies a positive or negative polarity to the value of the phase input from the ROM 20, and provides an output of this phase with the polarity applied to the register 27 and adder 28 which are provided in the unwrap circuit T3. Here, in this Example, if the data that is output from the XOR 19 is determined to be the value "1", a negative polarity (−1) is applied (inverted polarity), but if the data that is output from the XOR 19 is determined to be the value "0", a positive polarity (+1) is applied (non-inverted polarity).

Figure 7:
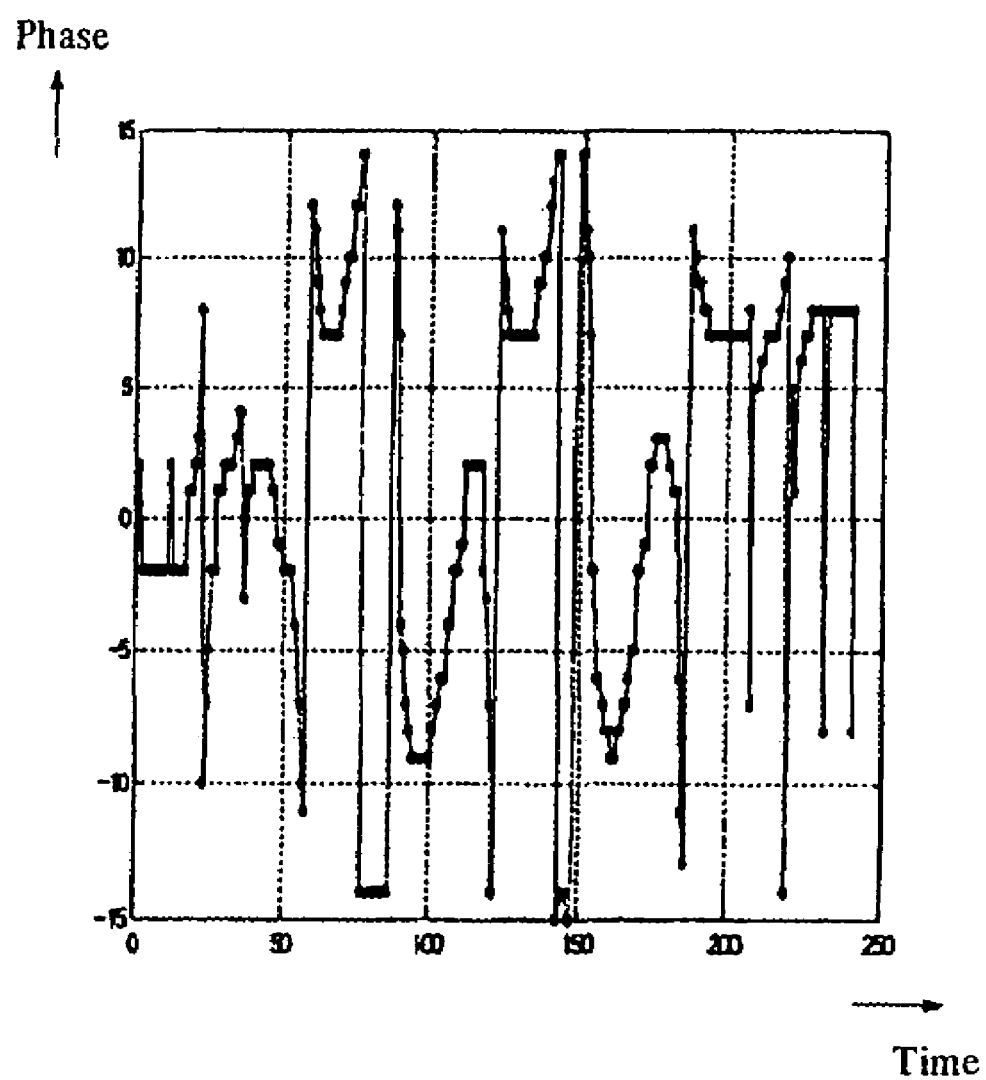
FIG. 7 is a diagram showing one example of values of the phase outputted from ROM with a positive or negative polarity applied.

In addition, FIG. 7 illustrates one example of the phase that is output from the multiplier 21 (the value at the point "b" illustrated in FIG. 4), where the time is shown on the horizontal axis while the phase is shown on the vertical axis.

The offset level generation circuit T2 consists of a register 24 and an adder 25.

Based on the timing signal which is output from the timing generator 41 to be described later, the register 24 latches the value that is input from the adder 25 and outputs this value to this adder 25 and the adder 23.

The adder 25 performs sequential addition operations on the values which are input from the register 24 and outputs the results of this addition to this register 24.

By means of such a constitution and operation, the offset level generation circuit T2 outputs offset values to the adder 23 which are equivalent to the phase rotation due to π/4-shift QPSK.

The adder 23 adds the phase that is input from the multiplier 21 to the offset value input from the register 24 and outputs the result to adder 26.

Figure 8:
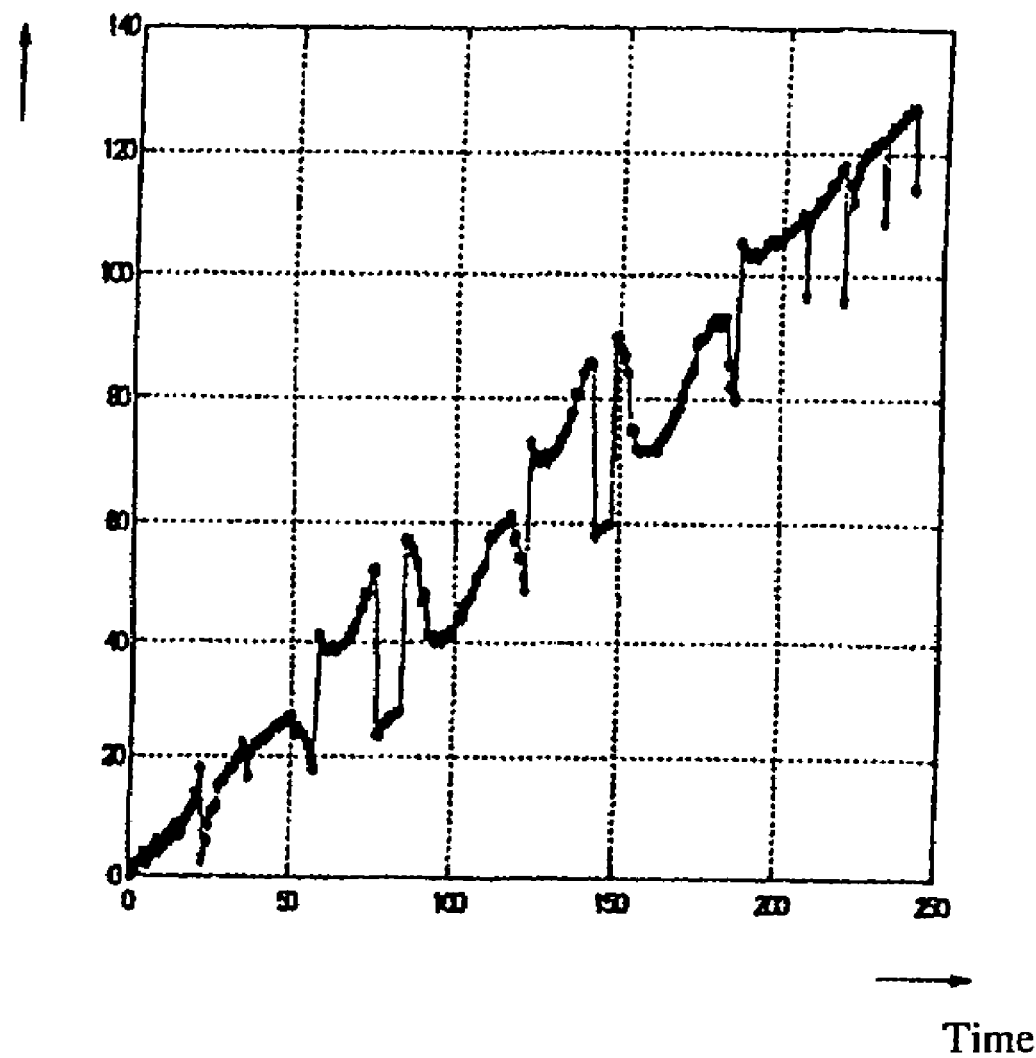
FIG. 8 is a diagram showing one example of values consisting of offset values which are equivalent to the phase rotation due to π/4-shift QPSK to which the phase is added.

Here, FIG. 8 illustrates one example of the phase that is output from the adder 23 (the value at the point "c" illustrated in FIG. 4), where the time is shown on the horizontal axis while the phase is shown on the vertical axis. As shown in FIG. 8, by adding an offset value to the phase, the phase rotation due to π/4-shift QPSK is added to the phase so as to generate the phase of the received signal.

In addition, in the waveform of the phase that is output from the adder 23, when the value of the phase is shifted by π or more, the value of one rotation of the phase is shifted in the positive (+) direction (or in the negative (−) direction), and this shift is corrected by the unwrap circuit T3.

The unwrap circuit T3 consists of two registers 27 and 32, two adders 28 and 31, an absolute value calculator 29, a polarity detector 30, and a multiplier 33.

Based on the timing signal that is output from the timing generator 41 to be described later, the register 27 shifts (e.g., delays) the phase data that is input from the multiplier 21 by the amount of one clock cycle and outputs the same to the adder 28.

The adder 28 (in this Example, a device that adds with positive and negative inverted) accepts an input of the phase data (taken to be X1 here) that is input from the multiplier 21 and also accepts an input of this data which is shifted by one clock cycle (taken to be X2 here) and outputs the difference between these two pieces of data (in this example, X2−X1) to the absolute value calculator 29 and the polarity detector 30.

The absolute value calculator 29 detects the absolute value of the difference which is input from the adder 28, and compares the magnitude of this absolute value against a stipulated value M (in this Example, M=16). If this absolute value is greater than or equal to the stipulated value M, the absolute value calculator 29 outputs a stipulated enable signal to the register (flip-flop circuit) 32, thereby putting the counting of the register 32 into the enabled state.

The polarity detector 30 detects the polarity (positive or negative) of the difference which is input from the adder 28, and if a positive polarity is detected, outputs a polarity bit signal indicating a "+1" value to the adder 31. However, if a negative polarity is detected, the polarity detector 30 outputs a polarity bit signal indicating a "−1" value to the adder 31.

The adder 31 adds the value of the signal that is input from the register 32 to the value ("+1" or "−1") of the signal that is input from the polarity detector 30, and outputs the result of this addition to this register 32.

The register 32 operates based on the timing signal that is output from the timing generator 41 to be described later and the addition signal that is input from the aforementioned adder 31, and specifically, its counting is put into the enabled state by an enable signal which is input from the absolute value calculator 29, and the value of this count is output to the multiplier 33 and is also output to the aforementioned adder 31.

The multiplier 33 multiplies the value that is input from the register 32 by 32, and outputs this value multiplied by 32 (the offset value of the phase in unwrap circuit T3) to the adder 26.

Figure 9:
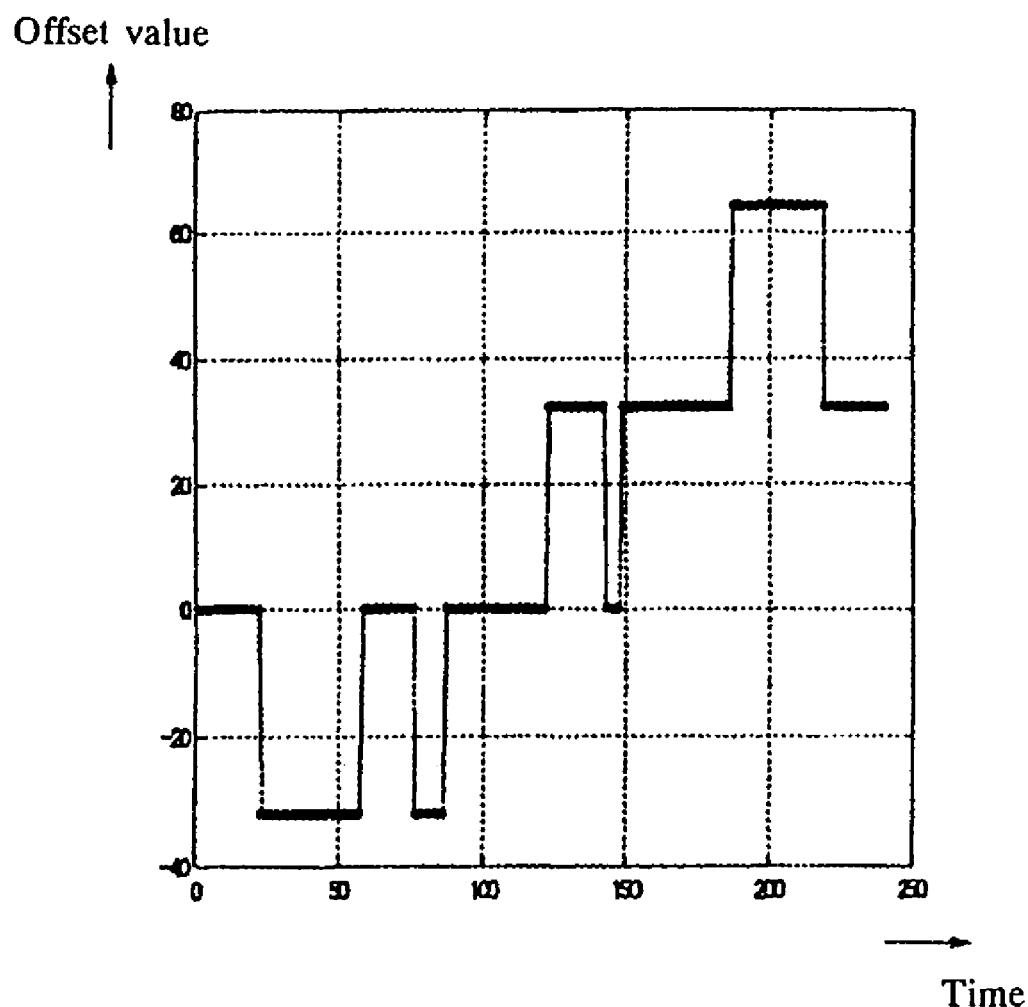
FIG. 9 is a diagram showing one example of an offset value that is output from an unwrap circuit.

Here, FIG. 9 illustrates one example of the value that is output from the multiplier 33 (the value at the point "d" illustrated in FIG. 4), where the time is shown on the horizontal axis while this value (the offset value of the phase in unwrap circuit T3) is shown on the vertical axis. By using an offset value as shown in FIG. 9, the value of the phase in the adder 26 can be shifted by π, and thus when the value of the phase is discontinuous, it can be corrected to a continuous value.

The adder 26 adds the phase that is input from the adder 23 to the offset value that is input from the multiplier 33 and outputs the result of this addition to a bandpass filter 34 which is provided in the filter circuit T4.

Figure 10:
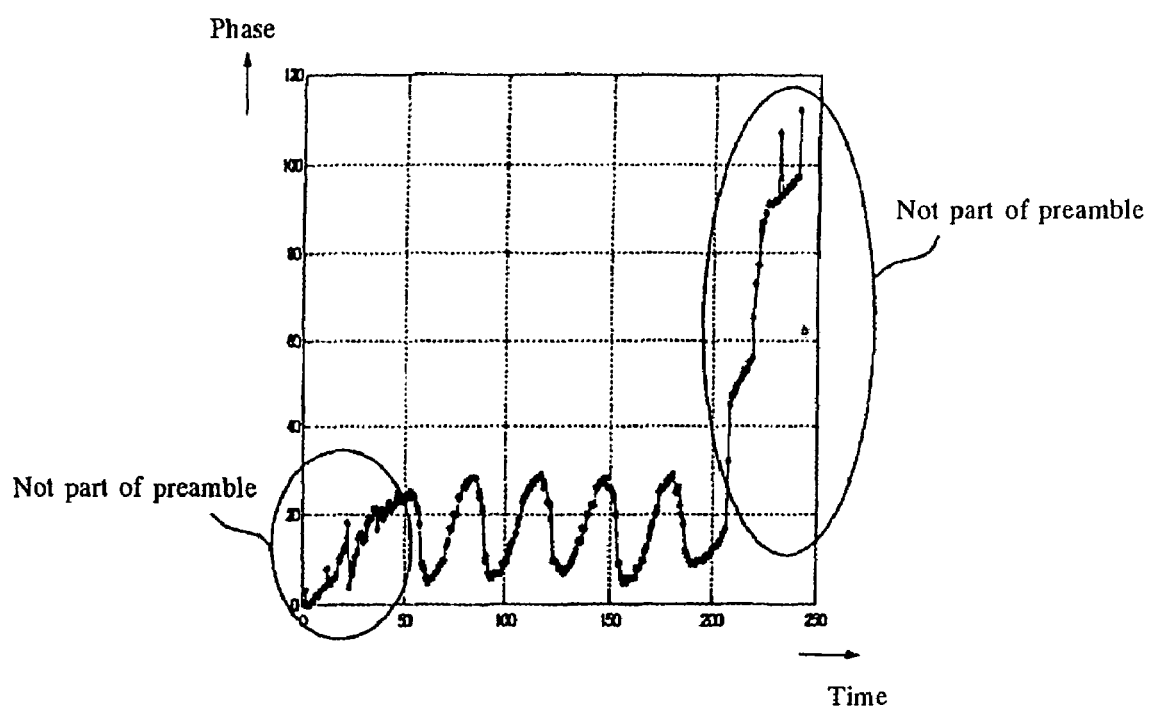
FIG. 10 is a diagram showing one example of the waveform of a phase after unwrap.

Here, FIG. 10 illustrates one example of the value that is output from the adder 26 (the value at the point "e" illustrated in FIG. 4), where the time is shown on the horizontal axis while this value (the offset value of the phase in unwrap circuit T3) is shown on the vertical axis. Note that the phase waveform is disturbed at positions at the edges of the graph in FIG. 10, but these portions of the waveform are not part of the preamble pattern.

Figure 11:
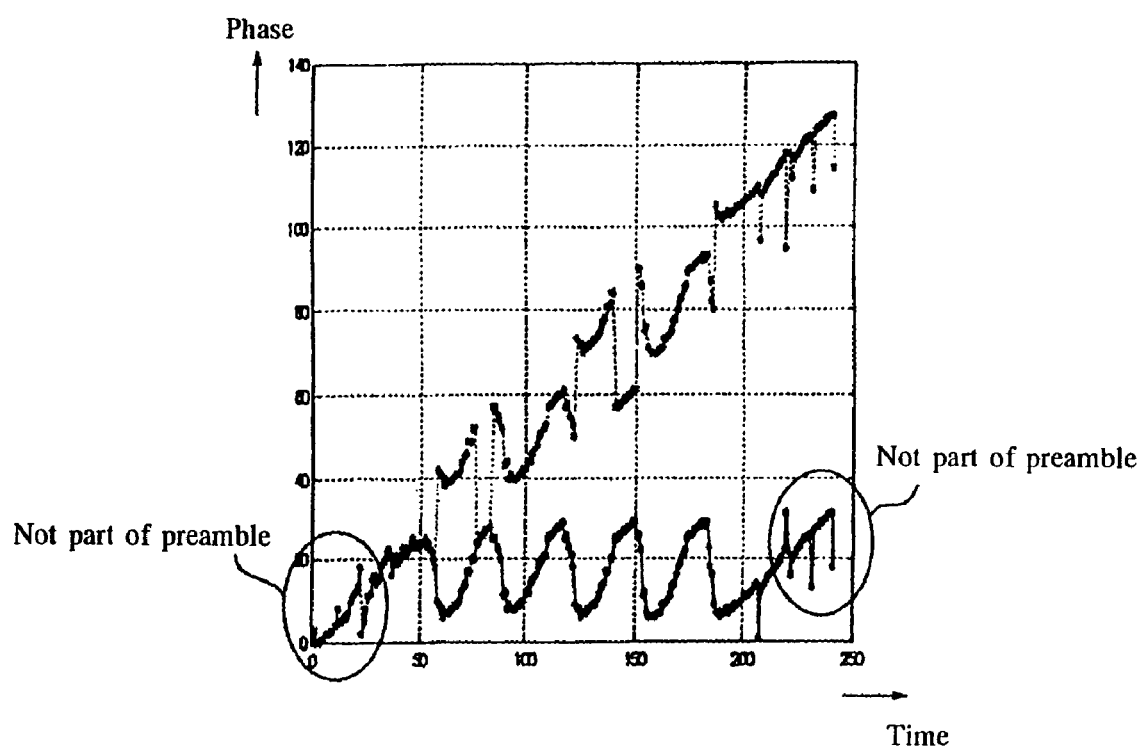
FIG. 11 is a diagram that compares waveforms before and after unwrap.

In addition, FIG. 11 illustrates the waveform shown on FIG. 8 above (the waveform prior to unwrapping) and the waveform shown on FIG. 11 above (the waveform after unwrapping) upon the same graph, where the time is shown on the horizontal axis while the phase is shown on the vertical axis. As shown in FIG. 11, the slope in the waveform prior to unwrapping is removed by the unwrap circuit T3, thus generating a waveform after unwrapping that has no slope.

In addition, since the values of the phase that is output from adder 26 have an offset in the positive direction, the positive DC components (DC) are removed by the filter circuit T4.

The filter circuit T4 is provided with a bandpass filter 34. The bandpass filter 34 removes the DC components and noise and the like from the phase (signal) that is input from the adder 26, and outputs the value of the phase difference after this removal as a polarity bit to the polarity bit converter Z (note that the bandpass filter 34 in this Example may have the function of differentiating the input signal and outputting the derivative, for example).

The polarity bit converter Z outputs data with a value of "1" to the register 35 and the XOR 36 which are provided in the change point extraction circuit T5 if the polarity of the value that is input from the bandpass filter 34 is positive, but outputs data with a value of "0" to the register 35 and the XOR 36 if the polarity is negative.

Figure 12:
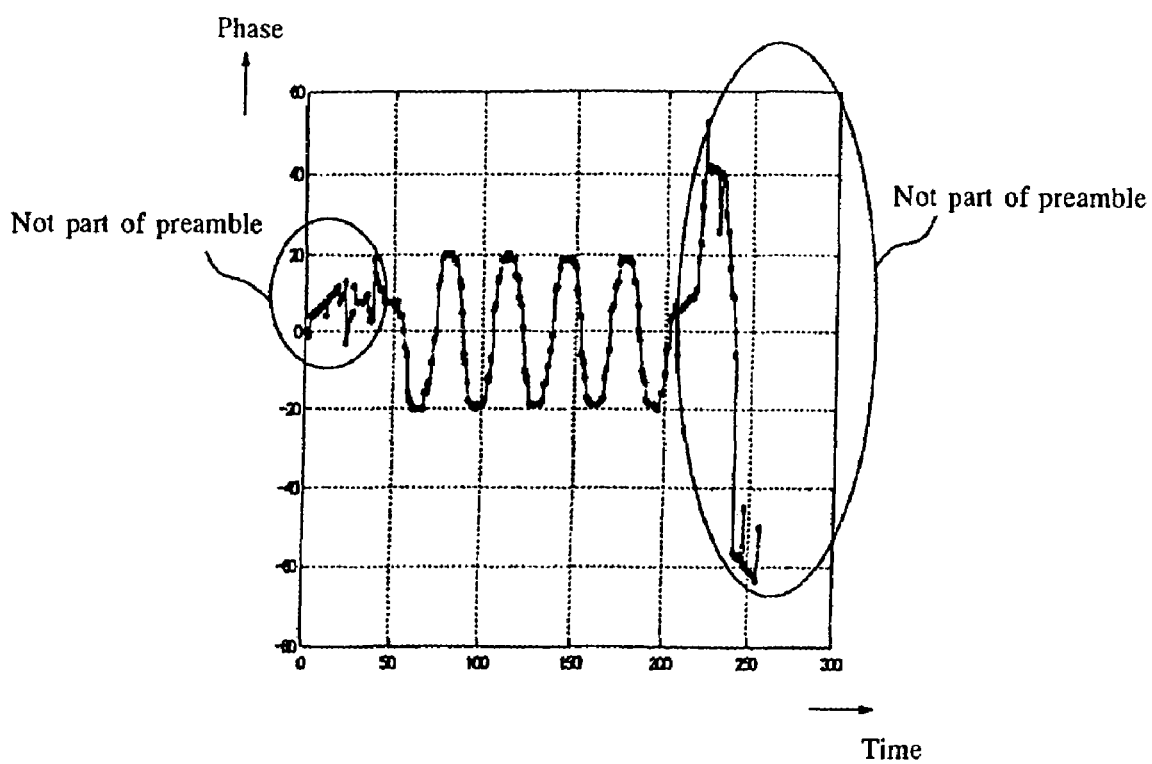
FIG. 12 is a diagram that shows one example of the waveform of the phase difference with the DC components removed.

Here, FIG. 12 illustrates one example of the phase difference that is output from the bandpass filter 34 (the value at the point "f" illustrated in FIG. 4), where the time is shown on the horizontal axis while the phase difference is shown on the vertical axis. Note that the phase waveform is disturbed at positions at the edges of the graph in FIG. 12, but these portions of the waveform do not pertain to the preamble pattern. As shown in FIG. 12, the waveform of the phase difference which is output from the bandpass filter 34 oscillates between positive and negative about the zero (0) point of the phase value, so the points where the value of the waveform changes from positive to negative and the points where the value of the waveform changes from negative to positive (the zero cross points) can be detected as positive/negative change points in the phase difference.

The change point extraction circuit T5 consists of a register 35 and an XOR 36.

Based on the timing signal that is output from the timing generator 41 to be described later, for example, the register 35 shifts (e.g., delays) the value of the data that is input from polarity bit converter Z by one clock cycle and outputs the result to the XOR 36.

In the case where the values of data that are input from the polarity bit converter Z and the register 35 are different, the XOR 36 provides output to a serial/parallel converter 37 which is provided in the change point measurement circuit T6 data of the value "1," or provides output to the serial/parallel converter 37 of data of the value "0" in the case where the values of data that are input from the polarity bit converter Z and the register 35 are the same (namely the positive or negative polarity of the data value is unchanged).

By means of such a constitution and operation, the change point extraction circuit T5 is able to extract the timing (positive/negative change points) at which the value of the waveform of the phase difference crosses the zero (0) point. To wit, specifically, for the waveform of the phase difference, it is possible to compare the polarity (positive/negative) of data which is not shifted by one clock cycle against the polarity (positive/negative) of data which is shifted by one clock cycle, and thus detect the points of the timing at which these two polarities are different (points at which the polarity changes) as the positive/negative change points of the phase difference.

The change point measurement circuit T6 consists of a serial/parallel converter 37, an adder 38, and a register 39.

The serial/parallel converter 37 converts data that is input from the XOR 36 from serial data to parallel data, and outputs this data (in this Example, data that represents the time interval between adjacent values of "1") to the adder 38.

The adder 38 cumulatively adds the values of data that is input from the serial/parallel converter 37 a total of 16 times (16 clock cycles), and outputs the results of addition to the register 39.

Based on a timing signal that is output from a timing generator 41 to be described later, for example, the register 39 shifts the results of addition (a binary value) input from the adder 38 by 4 bits (in the direction of the smaller places) and outputs this shifted results of addition (average value) to a synchronizer 40 which is provided in the clock synchronization circuit T7. Note that when the 4-bit shift described here is performed, the results of addition are divided by 16, and thus, the results of addition of the 16 values are divided by 16 to give an average value.

By means of such a constitution and operation, the change point measurement circuit T6 counts and cumulatively adds 16 values of the timing (in this Example, data that represents the time interval between adjacent values of "1") of the positive/negative change points of the measured phase difference, and then performs a 4-bit shift of the binary value of the results of addition so as to obtain an average value.

Note that the number of values of the change point timing (number of samplings) which is used when obtaining the average value of the positive/negative change point timing of the phase difference may be various, and as one example, it is preferable to use the average value of eight values of the change point timing near the center of the 20 symbols constituting the preamble pattern where it is (assumed to be) stable.

The clock synchronization circuit T7 is provided with a synchronizer 40.

Based on the timing signal that is input from the timing generator 41 to be described later, for example, and the average value (of the positive/negative change point timing of the phase difference) that is input from the register 39, the synchronizer 40 establishes the clock timing and outputs a base (synchronization) clock signal according to the synchronization timing thus established.

Note that specifically, in the synchronizer 40, the clock is reset based on the timing signal that is input from the timing generator 41 and also, the clock is reset at each time interval corresponding to the average value (of the positive/negative change point timing of the phase difference) which is input from the register 39, and thus the synchronization of the clock can be established. In this manner, by using average values from a plurality of samplings of the time intervals at which positive/negative change points in the phase difference are detected, it is possible to establish the clock synchronization.

The timing generation circuit T8 is provided with a timing generator 41.

Based on the timing signal that is input from the timing generator 41 to be described later, for example, the timing generator 41 generates a timing signal that determines the position when the clock is reset (position of the start of synchronization), and outputs this timing signal to the synchronizer 40 and the like.

As described above, in the synchronization establishment circuit of this Example, at the time that a (received) burst signal which is modulated by means of the π/4-shift QPSK modulation scheme is demodulated by means of the π/4-shift QPSK demodulation scheme, the temporal phase difference (phase change) of the preamble pattern is detected, the detected phase difference is set as an offset level, the polarity of the phase difference as the offset level is detected, and a base clock signal is generated based on the time intervals at which the detected points of change of polarity occur.

In addition, at this time, in the synchronization establishment circuit of this Example, by taking advantage of the fact that the phase difference (phase change) of the preamble pattern periodically alternates between positive and negative, specifically, the polarity of this phase difference is detected and also the timing at which this polarity changes between positive and negative is detected, and by resetting the clock based on the results of calculating the average value of the time interval at which the this polarity changes between positive and negative, clock synchronization is established.

Moreover, in a demodulation circuit equipped with such a synchronization establishment circuit according to this Example, it is possible to accurately demodulate the unique word and data which are contained in a received burst signal according to the base clock signal which is generated by the synchronization establishment circuit according to this Example.

Accordingly, in the synchronization establishment circuit of this Example, by establishing the clock synchronization based on the timing at which the phase difference of the preamble pattern periodically alternates between positive and negative, it is possible to establish synchronization in a short period of time. Thereby, it is possible to make the length (period) of the preamble pattern relatively short and increase the data transmission rate. In addition, even when a preamble pattern of a short length (period) is used, synchronization is established within the period of the preamble pattern, so it is possible for the received data in the first burst reception to be received correctly and reliably.

Note that in the synchronization establishment circuit of this Example, the carrier signal is not generated autonomously, for example, but rather the relative phases of the preamble pattern that is contained in the (received) burst signal are used to establish synchronization. In this case, in the synchronization establishment circuit of this Example, the phase difference is processed as a periodic waveform and also, the positive or negative polarity of the value of this waveform is determined to detect the positive/negative change point timing of the phase difference, and the synchronization is established based on the results of this detection.

In a demodulation circuit which is equipped with the synchronization establishment circuit of this Example, at the time that demodulation is performed as described above, for example, it is also possible to establish synchronization from a plurality of (received) burst signals for each burst signal, and to demodulate each burst signal according to the synchronization timing thus established (for each burst signal).

In this case, with the synchronization establishment circuit of this Example, synchronization can be established in a short period of time, so even in the case in which a plurality of (received) burst signals containing preamble patterns as in this Example are received at nearly the same timing, it is possible to establish synchronization with each of the plurality of burst signals in a short period of time, and thus it is possible to establish synchronization in a short period of time with the entire plurality of burst signals.

Here, in this Example, the preamble pattern in which "1001" repeats is equivalent to the "synchronization establishment signal wherein the change of the phase periodically alternates between positive and negative" which is referred to in the present invention, and the received burst signal containing this preamble pattern is equivalent to the "received signal containing a synchronization establishment signal" which is referred to in the present invention.

In addition, in this Example, the change point extraction circuit T5 shown in FIG. 4 above has the function of detecting the timing at which the change in phase of the preamble pattern that is contained in the received burst signal changes between positive and negative, and constitutes the "positive/negative change timing detection means" which is referred to in the present invention.

In addition, in this Example, the clock synchronization circuit T7 shown in FIG. 4 above has the function of establishing clock synchronization from the received burst signals based on the detected timing, and constitutes the "synchronization establishment means" which is referred to in the present invention.

Figure 13:
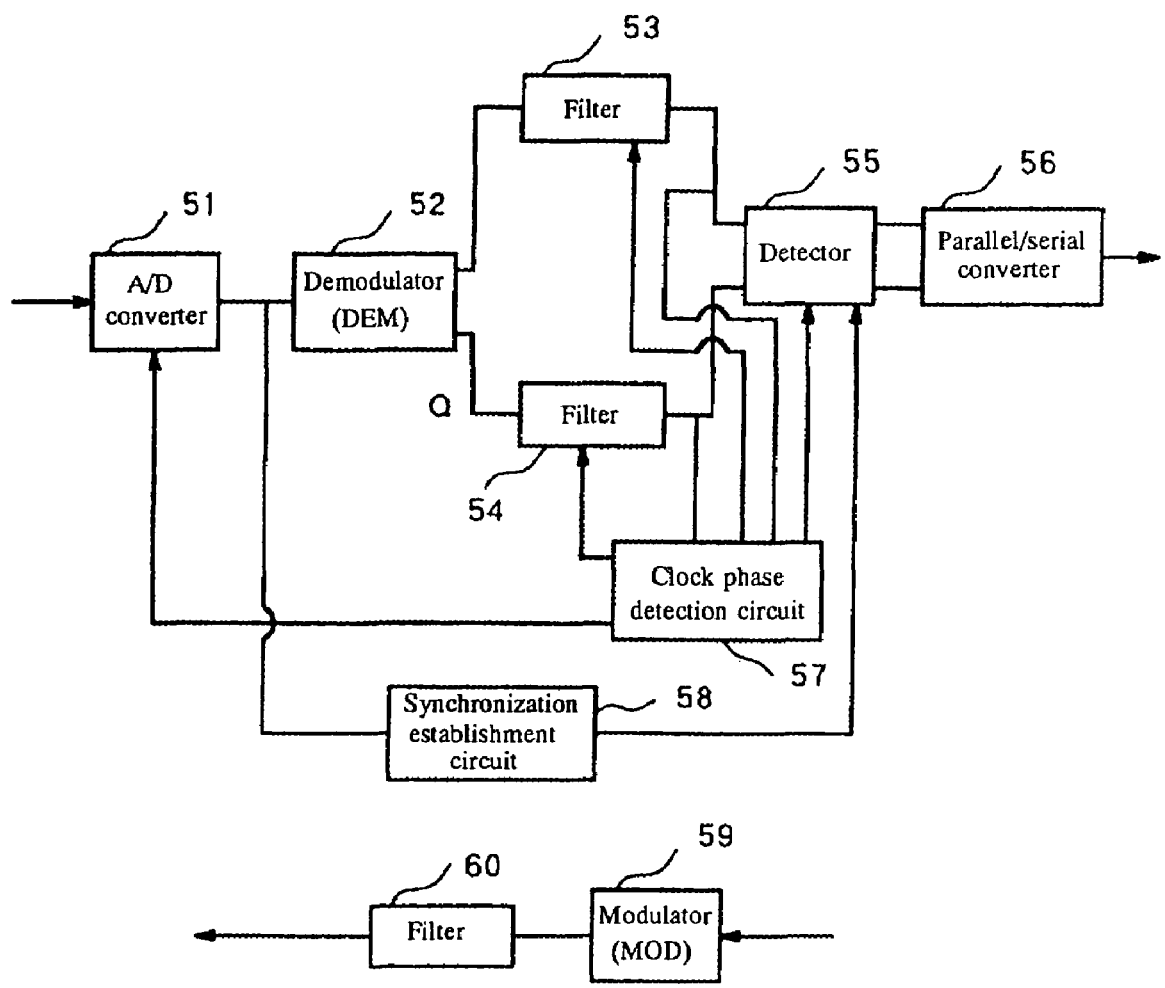
FIG. 13 is a schematic diagram of an example of the constitution of a transceiver modem according to Example 2 of the present invention.

Next, we shall describe a transceiver modem (modem) as Example 2 of the present invention with reference to FIG. 13. Note that the transceiver modem according to this Example is mounted within wireless communications equipment that performs wireless communications by using the π/4-shift QPSK modulation/demodulation scheme, and is provided between an antenna that transmits and receives wireless signals and the controller that controls the various signals thus transmitted and received, thereby connecting the antenna and the controller.

FIG. 13 is a schematic diagram of an example of the constitution of a transceiver modem according to this Example. This transceiver modem consists of an A/D converter 51, a demodulator 52, two filters 53 and 54, a detector 55, a parallel/serial converter 56, a clock phase detection circuit 57, and a synchronization establishment circuit 58 as the circuits on the receiving side. The transceiver modem also consists of a modulator 59 and a filter 60 as the circuits on the transmitting side.

We shall first describe the circuits on the receiving side.

The A/D converter 51 converts signals that are received via the antenna from analog signals to digital signals, and outputs the converted received signal to the demodulator 52 and the synchronization establishment circuit 58.

The synchronization establishment circuit 58 may be constituted with the same circuit constitution as that shown in FIG. 4 above, for example, and establishes clock synchronization based on received signals (e.g., the same preamble pattern as that illustrated in Example 1 above) that are input from the A/D converter 51, and outputs a base clock signal generated thereupon to a detector 55 to be described later.

The demodulator 52 demodulates the I component and the Q component of the received signal that is input from the A/D converter 51, and outputs this I component to one of the filters 53 and outputs this Q component to the other of the filters 54.

The one filter 53 takes the I component that is input from the demodulator 52, filters it and outputs the filtered I component to the detector 55.

The one filter 54 takes the Q component that is input from the demodulator 52, filters it and outputs the filtered Q component to the detector 55.

The detector 55 performs delayed detecting based on the base clock signal which is input from the synchronization establishment circuit 58 Specifically, the I and Q components that are input from the two filters 53 and 54 are detected (demodulated) and the demodulated data (2-bit) thus obtained is output to the parallel/serial converter 56.

The parallel/serial converter 56 converts demodulated data that is input from the detector 55 from parallel data to serial data and outputs the same to the controller.

Note that the clock phase detection circuit 57 detects the phase of the clock and supplies the results of the detection as output to the A/D converter 51, the two filters 53 and 54 and the detector 55.

Next, we shall describe the circuits on the transmitting side.

The modulator 59 accepts input from the controller of a signal (data) to be transmitted, modulates this signal and outputs the same to the filter 60.

The filter 60 filters the modulated signal that is input from the modulator 59 and outputs the same to the antenna.

In this manner, with the transceiver modem according to this Example, the receiver inputs a signal which is received wirelessly via the antenna, and the modulator modulates this received signal and outputs the modulated signal to the controller. On the other hand, at the time that the modulator modulates the signal that is input from the controller and the transmitter wirelessly transmits this modulated signal via the antenna, the received signal is demodulated by a demodulation circuit which is equipped with a synchronization establishment circuit 58 such as that illustrated in Example 1 above, for example. Thus, with the transceiver modem according to this Example, it is possible to obtain effects such as being able to establish synchronization in a short period of time, in the same manner as that described in relation to the synchronization establishment circuit illustrated in Example 1 above, for example.

Here, the "modulation means" which is referred to in the present invention is constituted in this Example by the function of the modulator 59 modulating the transmitted signal (data subject to transmission).

In addition, the "positive/negative change timing detection means" and "synchronization establishment means" which are referred to in the present invention are constituted in this Example by the functions of the synchronization establishment circuit 58 detecting the timing at which the positive/negative polarity of the phase changes in the preamble pattern that is contained in the received burst signal, and establishing clock synchronization from this received burst signal based on the detected timing.

In addition, the "demodulation means" which is referred to in the present invention is constituted in this Example by the function of the detector 55 demodulating the (unique word and data contained in the) received burst signal according to the synchronization timing which is established by the synchronization establishment circuit 58.

Next, we shall describe a base station which is used in the Advanced Cruise-Assist Highway System (AHS) as Example 3 of the present invention, with reference to the drawings. Note that the Advanced Cruise-Assist Highway System in this Example is one example of the "traffic information system" which is referred to in the present invention.

Figure 14:
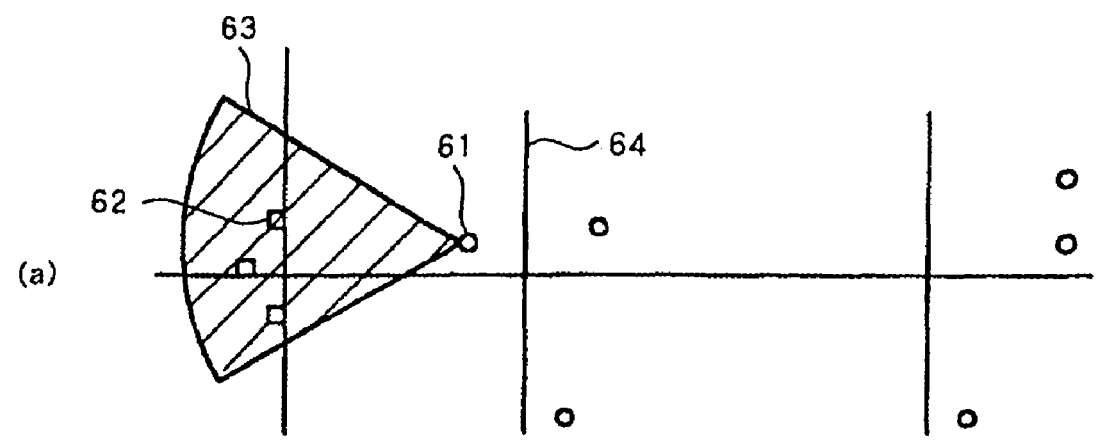
FIG. 14 is a schematic diagram of an example of the constitution of the Advanced Cruise-Assist Highway System according to Example 3 of the present invention, along with an example of the constitution of burst signals.
Figure 14:
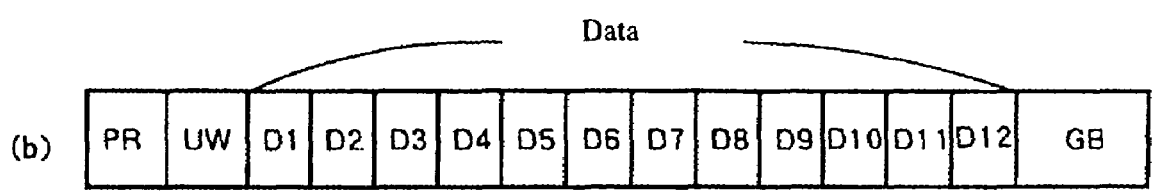

FIG. 14(a) is a schematic diagram of an example of the constitution of the Advanced Cruise-Assist Highway System according to this Example This system consists of a plurality of base stations 61 installed (in a fixed manner, for example) in the vicinity of roads 64, and a plurality of mobile stations 62 (wireless equipment installed in automobiles or other mobile equipment, for example) that move along the roads 64. Note that FIG. 14(a) includes symbols ("64," "61," "62") for only a portion of the roads, one base station and one mobile station, and the symbols are omitted for the others. In addition, the cell 63 of base station 61 which is given a symbol is illustrated as an example.

In the Advanced Cruise-Assist Highway System illustrated in FIG. 14(a), one base station 61 uses the π/4-shift QPSK modulation/demodulation scheme, for example, to wirelessly communicate traffic-related information or the like to a plurality (a maximum of 12 in this Example) of mobile stations 62 present within the cell of the base station 61.

In addition, in the Advanced Cruise-Assist Highway System of this Example, when wireless communications are performed by using a burst signal containing a preamble pattern like that illustrated in Example 1 above, for example, the frame format of the burst signal used in communications from the base station 61 of this Example to the mobile stations 62 may have, as shown in FIG. 14(b) for example, twelve slots D1 through D12 in the data portion, and thus, it is possible for one base station 61 to communicate wirelessly with a maximum of twelve mobile stations 62 (simultaneously).

Figure 15:
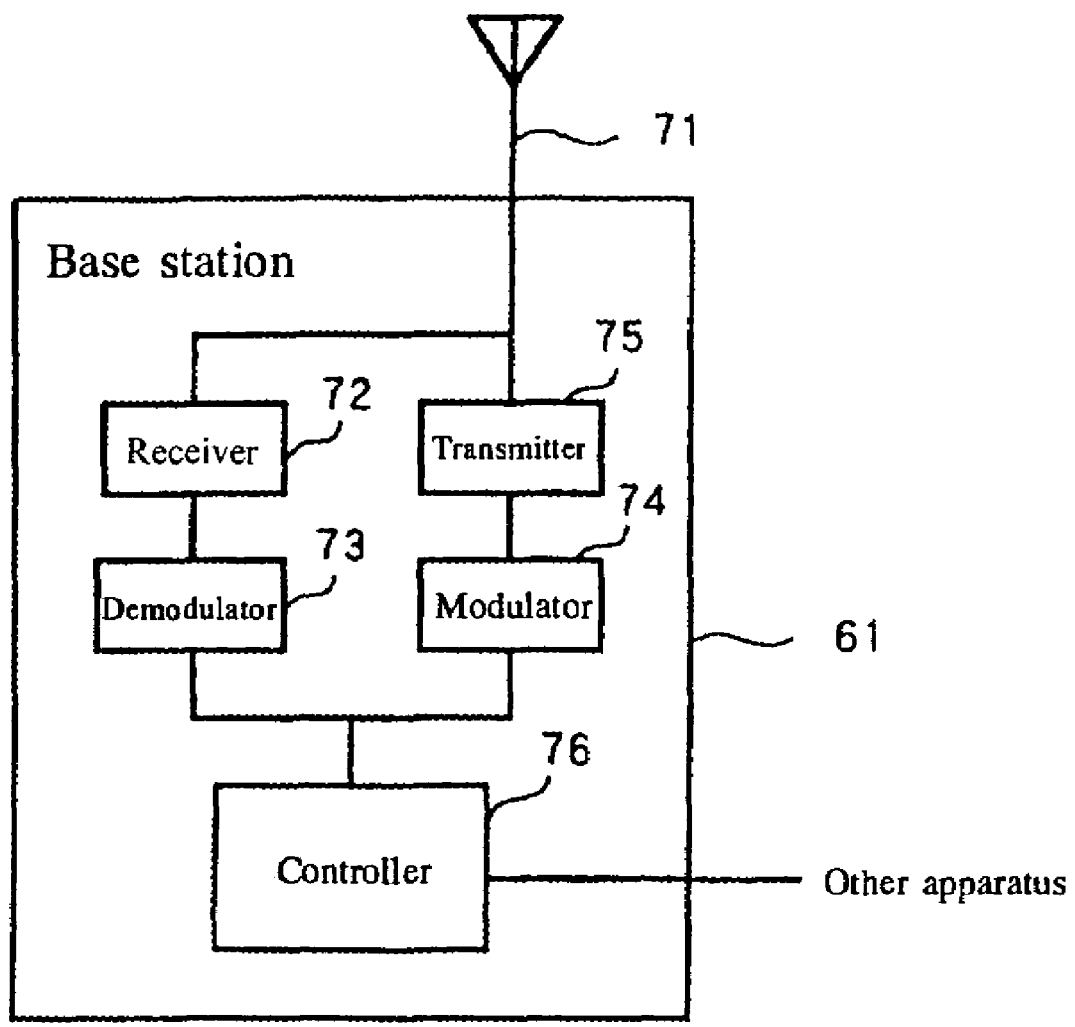
FIG. 15 is a diagram showing an example of the constitution of a base station which is provided for the Advanced Cruise-Assist Highway System.

FIG. 15 is a diagram showing an example of the constitution of the aforementioned base station. This base station 61 consists of an antenna 71, a receiver 72, a demodulator 73, a modulator 74, a transmitter 75, and a controller 76.

The antenna 71 receives wireless signals.

Via the antenna 71, the receiver 72 receives signals that are transmitted wirelessly from the mobile stations 62, and provides an output of these received signals to the demodulator 73.

The demodulator 73 has a synchronization establishment circuit like that illustrated in FIG. 4 above and also has a circuit for demodulating the received signals. The demodulator 73 establishes clock synchronization based on the received signals (e.g., a preamble pattern like that illustrated in Example 1 above) which are input from the receiver 72 and also modulates the received signals based on the synchronization clock thus established, and provides an output of the results of this demodulation to the controller 76.

The modulator 74 accepts an input from the controller 76 of signals (data) to be transmitted, modulates these signals and outputs the same to the transmitter 75.

The transmitter 75 uses the antenna 71 to wirelessly transmit modulated signals which are input from the modulator 74 to the mobile stations 62.

The controller 76 may be connected to another apparatus (e.g., other base stations or a main control facility) by wire, for example, and may transmit signals (demodulated data) which are input from the demodulator 73 to this other apparatus, or the controller 76 may receive signals (data) which are transmitted from this other apparatus and output the same to the modulator 74, thereby performing the exchange of sent/received signals with this other facility.

As described above, with the base station 61 of this Example, when the receiver 72 accepts an input of signals that are wirelessly received via the antenna 71, modulates these received signals and outputs them to the controller 76, or when the modulator 74 modulates signals which are input from the controller 76 and the transmitter 75 wirelessly transmits these modulated signals from the antenna 71, a demodulator 73 which is provided with a synchronization establishment circuit like that illustrated in Example 1 above is used to demodulate the received signals. For this reason, with the base station 61 of this Example, in the same manner as described with regard to the synchronization establishment circuit illustrated in Example 1 above, synchronization can be established in a short period of time and other meritorious effects can be obtained.

As one example, with the base station 61 of this Example, even in the case in which a plurality of mobile stations 62 enter its cell 63 at a high speed and synchronization must be established quickly with each of the mobile stations 62, it is possible to establish this synchronization in a short period of time as described in Example 1 above, and as a result, communication with each of the mobile stations 62 is possible.

Note that in the prior-art synchronization detection scheme, while transmitting and receiving between one base station and one mobile station (namely one-to-one transmitting and receiving) is possible, in the case in which a plurality of mobile stations enter the cell at a high speed as described above, a problem arose wherein the mobile stations would leave the cell before the base station had established synchronization. In addition, with PHS, for example, because of the synchronization detection scheme that is adopted therein (a scheme wherein synchronization is established gradually while performing feedback of the signal subject to synchronization), communication between one base station and a plurality of mobile stations is performed, but with PHS, in order to establish communication between a base station and a high-speed mobile station, simultaneous transmission and reception with a different base station is utilized. To wit, with PHS, a single base station cannot establish synchronization quickly. The base station 61 of this Example can solve this problem with the prior art.

Here, in the base station 61 of this Example, the antenna 71 that transmits and receives wireless signals is equivalent to the "antenna" which is referred to in the present invention.

In addition, in the base station 61 of this Example, the signal modulating function of the modulator 74 constitutes the "modulation means" which is referred to in the present invention.

In addition, in the base station 61 of this Example, the function whereby the transmitter 75 wirelessly transmits modulated signals to the mobile stations 62 via antenna 71 constitutes the "transmission means" which is referred to in the present invention.

In addition, in the base station 61 of this Example, the function whereby the receiver 72 receives wirelessly transmitted signals from the mobile stations 62 via the antenna 71 constitutes the "receiving means" which is referred to in the present invention.

In addition, in the base station 61 of this Example, the function whereby the demodulator 73 detects the timing of the positive/negative polarity change in the change in phase of the preamble pattern that is contained in the received burst signal, and establishes clock synchronization from the received burst signal based on the detected timing, and the function whereby the (unique word and data contained in the) received burst signal is demodulated according to the established synchronization timing constitute the "positive/negative change timing detection means," the "synchronization establishment means" and the "demodulation means" which are referred to in the present invention.

In addition, in the base station 61 of this Example, the function whereby the controller 76 communicates the signals that are exchanged with the mobile stations 62 to external apparatus constitutes the "control means" which is referred to in the present invention.

Here, the embodiment of the demodulation method according to the present invention, and the constitution of the synchronization establishment apparatus, modem or traffic information system according to the present invention are in no way limited to those illustrated above, but rather various embodiments or constitutions may be used.

In addition, the applicable fields of the present invention are in no way limited to those illustrated above, but rather the present invention is applicable to various fields.

In addition, described above is the demodulation method and apparatus of the side that establishes synchronization based on a synchronization establishment signal (the receiving side), but the modulation method and apparatus of the side that transmits such a synchronization establishment signal is to have a constitution whereby it generates a signal that contains a synchronization establishment signal (e.g., a preamble pattern such as that illustrated in Example 1 above) wherein the change in phase periodically alternates between positive and negative (e.g., a burst signal modulated by the $\pi/4$-shift QPSK modulation scheme) and transmits the same to the receiving side.

In addition, the synchronization establishment processing and various types of processing which are performed by the method and apparatus according to the present invention may be constituted by being implemented in hardware resources which are equipped with a processor and memory and the like, for example, being controlled by means of a processor executing a control program stored in ROM. In addition, the various functional means for executing this processing may also be constituted as independent hardware circuits.

In addition, the present invention may also be understood as one wherein the above-described control program is stored in a floppy disk, CD-ROM or other computer-readable recording media, so that the processing according to the present invention can be implemented by loading the control program from the recording medium into a computer and executing the program by a processor.

As described above, with the demodulation method, synchronization establishment apparatus, modem and base station according to the present invention, synchronization is established from a received signal based on the timing of a change in the positive/negative polarity of the change in phase of a synchronization establishment signal that is contained in a received signal which contains a synchronization establishment signal wherein the change in phase (of the synchronization establishment signal) periodically alternates between positive and negative, and therefore, synchronization can be established in a short period of time and other meritorious effects can be obtained.

What is claimed is:

1. A synchronization establishment apparatus operable to establish synchronization from a received signal that contains a synchronization establishment signal whose change in phase periodically alternates between positive and negative, said synchronization establishment apparatus comprising:

positive/negative change timing detection means for detecting a timing of changes in the positive/negative polarity of the change in phase of the synchronization establishment signal contained in the received signal;

synchronization establishment means for establishing synchronization from the received signal based on the timing detected by said positive/negative change timing detection means;

an A/D converter operable to convert the received signal from an analog signal to a digital signal;

a phase detection circuit operable to, based on the converted digital signal, demodulate I component data and Q component data, acquire the phase corresponding to the absolute value of the I component data and the absolute value of the Q component data, output a value which is the value of the acquired phase to which a negative polarity is applied when the positive/negative polarity of the I component data and the positive/negative polarity of the Q component data are different, and output a value which is the value of the acquired phase to which a positive polarity is applied when the positive/negative polarity of the I component data and the Q component data are the same;

an offset level generation circuit operable to generate and output an offset value which is equivalent to a phase rotation due to $\pi/4$-shift QPSK;

a first adder operable to add the value outputted from said phase detection circuit to the offset value outputted from said offset level generation circuit, and to output an added value;

an unwrap circuit operable to output an offset value that corrects discontinuity data when the phase has been rotated by $\pi$;

a second adder operable to add the added value outputted from said first adder to the offset value outputted from said unwrap circuit, and to output a second added value;

a filter circuit operable to filter the second added value outputted from said second adder and to outputs the filtered second added value;

a polarity bit converter operable to output data of different values when the polarity of the filtered second added value outputted from said filter circuit is positive than when the polarity of the filtered second added value is negative;

a change point extraction circuit operable to, based on the data outputted from said polarity bit converter, extract the positive/negative change points in the value of the waveform of the phase difference;

a change point measurement circuit operable to average the positive/negative change point timing of the phase difference extracted by said change point extraction circuit, and to output the averaged positive/negative change point timing;

a clock synchronization establishment circuit operable to, based on the averaged positive/negative change point timing outputted from said change point measurement circuit, establish clock synchronization; and a timing generation circuit operable to, based on the timing at which the received signal starts, determine the position to reset a clock.

2. A synchronization establishment apparatus according to claim 1, wherein synchronization is established for each received signal from a plurality of received signals.

3. A synchronization establishment apparatus according to claim 1, wherein a preamble pattern in which 1001 is repeated in $\pi/4$-shift QPSK is used as the synchronization establishment signal, and a burst signal containing the preamble pattern is used as the received signal.

4. A modem operable to modulate transmitted signals, to establish synchronization from a received signal that contains a synchronization establishment signal whose change in phase periodically alternates between positive and negative, and to demodulate the received signal, said modem comprising:

modulating means for modulating transmitting signals;

positive/negative change timing detection means for detecting a timing of changes in the positive/negative polarity of the change in phase of the synchronization establishment signal contained in the received signal;

synchronization establishment means for establishing synchronization from the received signal based on the timing detected by said positive/negative change timing detection means;

demodulation means for demodulating the received signal according to the synchronization timing established by said synchronization establishment means;

an A/D converter operable to convert the received signal from an analog signal to a digital signal;

a phase detection circuit operable to, based on the converted digital signal, demodulate I component data and Q component data, acquire the phase corresponding to the absolute value of the I component data and the absolute value of the Q component data, output a value which is the value of the acquired phase to which a negative polarity is applied when the positive/negative polarity of the I component data and the positive/negative polarity of the Q component data are different, and output a value which is the value of the acquired phase to which a positive polarity is applied when the positive/negative polarity of the I component data and the Q component data are the same;

an offset level generation circuit operable to generate and output an offset value which is equivalent to a phase rotation due to $\pi/4$-shift QPSK;

a first adder operable to add the value outputted from said phase detection circuit to the offset value outputted from said offset level generation circuit, and to output an added value;

an unwrap circuit operable to output an offset value that corrects discontinuity data when the phase has been rotated by $\pi$;

a second adder operable to add the added value outputted from said first adder to the offset value outputted from said unwrap circuit, and to output a second added value;

a filter circuit operable to filter the second added value outputted from said second adder and to outputs the filtered second added value;

a polarity bit converter operable to output data of different values when the polarity of the filtered second added value outputted from said filter circuit is positive than when the polarity of the filtered second added value is negative;

a change point extraction circuit operable to, based on the data outputted from said polarity bit converter, extract the positive/negative change points in the value of the waveform of the phase difference;

a change point measurement circuit operable to average the positive/negative change point timing of the phase difference extracted by said change point extraction circuit, and to output the averaged positive/negative change point timing;

a clock synchronization establishment circuit operable to, based on the averaged positive/negative change point timing outputted from said change point measurement circuit, establish clock synchronization; and a timing generation circuit operable to, based on the timing at which the received signal starts, determine the position to reset a clock.

5. A modem according to claim 4, wherein synchronization is established for each received signal from a plurality of received signals, and each of the received signals is demodulated.

6. A modem according to claim 4, wherein a preamble pattern in which 1001 is repeated in π/4-shift QPSK is used as the synchronization establishment signal, and a burst signal containing the preamble pattern is used as the received signal.

7. A base station in a traffic information system in which base stations and mobile stations communicate wirelessly, said base station being operable to modulate signals and to wirelessly transmit the modulated signals to the mobile stations, to wirelessly receive a signal from the mobile stations that contains a synchronization establishment signal whose change in phase periodically alternates between positive and negative, to establish synchronization from the received signal, and to demodulate the received signal, said base station comprising:

an antenna operable to transmit and receive wireless signals;

modulating means for modulating signals;

transmission means for wirelessly transmitting modulated signals to the mobile stations via said antenna;

receiving means for receiving, via said antenna, signals transmitted wirelessly from the mobile stations;

positive/negative change timing detection means for detecting a timing of changes in the positive/negative polarity of the change in phase of the synchronization establishment signal contained in the received signal;

synchronization establishment means for establishing synchronization from the received signal based on the timing detected by said positive/negative change timing detection means;

demodulation means for demodulating the received signal according to the synchronization timing established by said synchronization establishment means;

control means for communicating the signals exchanged with the mobile stations to an external apparatus;

an A/D converter operable to convert the received signal from an analog signal to a digital signal;

a phase detection circuit operable to, based on the converted digital signal, demodulate I component data and Q component data, acquire the phase corresponding to the absolute value of the I component data and the absolute value of the Q component data, output a value which is the value of the acquired phase to which a negative polarity is applied when the positive/negative polarity of the I component data and the positive/negative polarity of the Q component data are different, and output a value which is the value of the acquired phase to which a positive polarity is applied when the positive/negative polarity of the I component data and the Q component data are the same;

an offset level generation circuit operable to generate and output an offset value which is equivalent to a phase rotation due to π/4-shift QPSK;

a first adder operable to add the value outputted from said phase detection circuit to the offset value outputted from said offset level generation circuit, and to output an added value;

an unwrap circuit operable to output an offset value that corrects discontinuity data when the phase has been rotated by π;

a second adder operable to add the added value outputted from said first adder to the offset value outputted from said unwrap circuit, and to output a second added value;

a filter circuit operable to filter the second added value outputted from said second adder and to outputs the filtered second added value;

a polarity bit converter operable to output data of different values when the polarity of the filtered second added value outputted from said filter circuit is positive than when the polarity of the filtered second added value is negative;

a change point extraction circuit operable to, based on the data outputted from said polarity bit converter, extract the positive/negative change points in the value of the waveform of the phase difference;

a change point measurement circuit operable to average the positive/negative change point timing of the phase difference extracted by said change point extraction circuit, and to output the averaged positive/negative change point timing;

a clock synchronization establishment circuit operable to, based on the averaged positive/negative change point timing outputted from said change point measurement circuit, establish clock synchronization; and a timing generation circuit operable to, based on the timing at which the received signal starts, determine the position to reset a clock.

8. A base station according to claim 7, wherein synchronization is established for each received signal from a plurality of received signals, and each of the received signals is demodulated.

9. A base station according to claim 7, wherein a preamble pattern in which 1001 is repeated in π/4-shift QPSK is used as the synchronization establishment signal, and a burst signal containing the preamble pattern is used as the received signal.

* * * * *